2,935,504

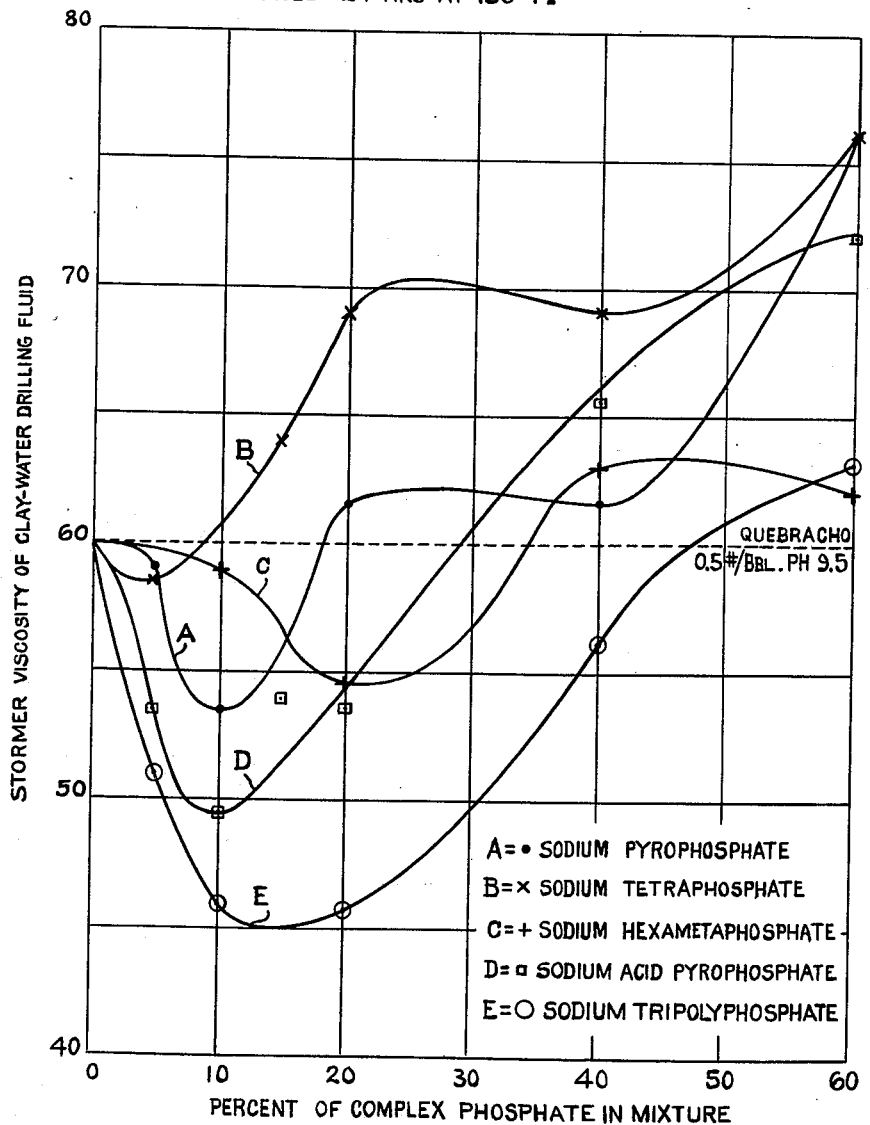

PROCESS OF IMPROVING THE EFFECTIVENESS OF THE COMPONENTS OF SPENT SULFITE LIQUOR AND THE PRODUCTS THEREOF

Ellis Gray King and Carl Adolphson, Bellingham, Wash., assignors to Puget Sound Pulp and Timber Co., Bellingham, Wash., a corporation of Delaware Application October 10, 1955, Serial No. 539,542

27 Claims. (Cl. 260—124)

Our invention and discovery relates to a process of treating spent sulfite liquor and to the products of said process whereby the effectiveness of the components is greatly increased.

More particularly our invention relates to the improving of said effectiveness of the components of said spent sulfite liquor by the manner of either (1) fractionation of said components, or (2) oxidation of said components, or (3) treatment to form the iron, aluminum, chromium, and copper salts of said components, or (4) by a combination of said oxidation and said salt formation.

Our said improvement of the said effectiveness of the components of spent sulfite liquor is very strikingly evidenced by the fact that in the specific use of the same in forming drilling muds thereof, they produce a product universally applicable to lime base, fresh water, and emulsion type of water-clay drilling muds. Let it be remembered that heretofore additives derived from spent sulfite liquor might be rendered useful in lime base muds but such would not be useful in fresh water muds.

Furthermore, more specifically our invention and discovery relates to the fractionation of purified spent sulfite liquor components and to improvement in additives for the preparation of drilling mud, but the product of our process is also useful as dispersing agents for use in the manufacture of structural clay products, dinnerware, Portland cement, pigments, plaster, etc. Our invention and discovery provides an unexpected result in converting components of spent sulfite liquor into very exceptionally effective additives both for water clay muds (fresh water muds) and for so-called lime base muds.

Our invention and discovery herein relates primarily and fundamentally to the treatment of spent sulfite liquor whereby there results the production of newly found properties and the properties of its components of greatly increased effectiveness. For purposes of clearness and definiteness of disclosure, we will set forth our invention and discovery particularly as applied to certain of its uses, and particularly to the exacting and numerous required properties of drilling muds, by way of illustration and not limitation—the said invention and discovery, however, includes all applications where like conditions exist in whole or in part, and the properties of our product are effective, for example, as dispersing agents. It would be difficult to find a more sensitive test of the increased effectiveness of the components of our invention than meeting the required properties of said drilling muds.

Also more specifically our invention and discovery relates to the process for the preparation of a drilling mud additive from spent sulfite liquor which preferably has been concentrated and preferably has part at least of its carbohydrates removed by fermentation treatment and also the product thereof which is the drilling mud additive and hereinafter referred to as a treated spent sulfite liquor additive.

Our invention and discovery is characterized by making it possible to greatly improve the effectiveness of the components of spent sulfite liquor with very simple and inexpensive equipment, in contrast to the very costly and elaborate equipment usually required in treating and refining spent sulfite liquor. The simplicity of the treatment of our invention and discovery is one of its outstanding features and accordingly, as a direct result of such simplicity, it does not require complex and costly equipment.

The improved effectiveness of the components of the spent sulfite liquor provides for their direct (i.e., in and of themselves) use as a drilling mud additive or as the base from which an improved drilling mud can be formed, which mud is characterized by having greatly improved properties.

The outstanding properties which must characterize a suitable drilling mud comprise the following of suitable magnitude: (1) initial gel strength; (2) suitable viscosity; (3) 10-minute gel strength; and (4) water loss, which relates to the sealing off of the wall of the drilling hole by building up a filter cake of mud on the wall, thus preventing loss of water from the mud. Thus, it is manifest that the drilling mud, with its exacting requirements of various properties for the mud is a most important, involved, and complex feature of oil and gas well drilling.

The hydrostatic pressure of the mud must be such as to prevent the gas which is trapped in certain strata from blowing out the mud. In short, this means that the mud involves a safety factor for the drilling operation—safety for the operators.

Universally, a drilling mud (having about the consistency of lubricating oil) is used in a circulating system with rotary well drilling mechanism, and is forced by pumping down the hollow drill stem through the bit which it lubricates and cools, then back to the surface to a settling pit. Thus it washes out the cuttings which have been made from the hole, and the cuttings are carried outside the drill stem to the surface where the coarse particles are caused to be removed and the mud again used in a continuous circulating process. To prevent the loss of the mud in porous strata, the mud must be of a character to seal off such strata and the mud, by its hydrostatic preessure, must prevent the escape of gas, that is, prevent the well from blowing out. To provide the proper hydrostatic pressure, the specific gravity of the mud may be increased by adding heavier material than clay, such as barytes. On the one hand the drilling fluid must have viscosity, that is, be thick enough to carry out the cuttings, but thin enough to be pumped and to allow the coarse particles to settle out so that the mud may be re-used.

In case of temporary stoppage of work, the mud should "gel" sufficiently to prevent settling of the suspended cuttings, which settled cuttings would "seize" the drill stem and prevent re-starting or its withdrawal from the well. From this it is manifest that the viscosity of the fluid is highly important. Likewise, the property to gel or set like gelatin is important when the agitation incident to drilling ceases. Thus, the mud will hold in suspension the cuttings and at the same time become fluid when agitation is resumed. This is called the "thixotropic" property of the fluid, or its gel strength. Most clays have this property but not all. Such property may be increased by adding the clay called bentonite and similar substances. As the drilling proceeds through different strata, the viscosity and gel strength may be affected by the character of the strata, by the loss by absorption of water or the in-flow of water and other fluids, by temperature changes, or by chemically active substances which may enter the drilling fluid as the drilling proceeds. Accordingly, viscosity gel and water loss are very carefully watched and corrected from time to time during the drilling. There are instruments provided for testing such properties at the mouth of the well.

In the early history of well drilling, water was added to thin the mud, but this had the objectionable result of reducing the specific gravity of the drilling fluid and thereby decreased its hydrostatic pressure property, and also decreased its ability to suspend the cuttings and the barytes which had been added to give weight. To overcome the effect of such addition of chemicals from the strata through which the well proceeded, i.e., the effect from so-called contaminants, other chemicals were added to offset the deleterious effects of such chemicals if encountered during the drilling.

In fact, the literature relating to drilling muds is so extensive and comprehensive and has extended over such a long period of time that it is very apparent that important difficulties, mechanical, chemical, and economical, are involved in the controlling, conditioning, and obtaining of the proper type of drilling mud. It is one of the fundamental objects and purposes of this invention and discovery to provide a process for making an inexpensive and highly effective mud additive to overcome the problems that have existed for so long in this field. Let it always be kept in mind that the value of the drilling mud depends on how much it will contribute to speed, efficiency, and safety in oil and gas well drilling. Our invention and discovery provides an additive for such purposes which is obtained from spent sulfite liquor and which is characterized by its economy as well as its very special effectiveness, not only for one of the two primary recognized types of drilling muds, i.e., "lime base" and "fresh water" muds, but for the special effectiveness of both of said types of muds.

Another object is to provide by means of our product, control against contaminants by formulation of a gypsum base (either as gypsum, with water of crystallization, or anhydrite, without water of crystallization) mud with low water loss and with low gel rate, i.e., a mud with a low initial gel strength so that sand and cuttings will settle out and be removed while the mud is in the mud bath or pit.

*Relative contaminants.*—In the drilling of deep wells such as oil and gas by the employment of a mud laden drilling fluid as in the rotary system of drilling, strata of a contaminating character may be encountered in large masses which often supply calcium sulfate to the drilling mud—this is very disadvantageous and alters or destroys required properties of the mud. Such calcium sulfate may be in the form of gypsum (calcium sulfate with water of crystallization) and anhydrite (calcium sulfate without water of crystallization). The literature states (Rogers "Composition and Properties of Oil Well Drilling Fluids," page 377):

"The first small additions of calcium sulfate increase the viscosity and gel strength of the mud fluid greatly but do not increase the fluid loss appreciably. This peak portion of the viscosity curve is reached at an addition of 33.3 p.p.m. calcium per gram of bentonite. As the concentration of calcium sulfate increases, the viscosity decreases and the fluid loss increases sharply."

As the concentration of the calcium sulfate increases, the viscosity decreases and the fluid loss increases sharply—obviously this feature evidences unpredictable character of contaminants upon the components of the drilling muds as respects the important properties which must characterize the mud. The different properties of the mud are affected differently. Rogers further states (said text, page 378):

". . . unfortunately, the addition of the soluble sodium sulfate results in a large increase in viscosity and gel strength. This effect is of such a magnitude that the method cannot be used in the field to overcome the adverse effects of the anhydrite. It can, however, be demonstrated in the laboratory."

The discovery and invention herein disclosed shows how this objectionable feature of sodium sulfate has been overcome, and to this extent the invention and discovery of applicants is contrary to the recognized literature in this field.

Other contaminating strata are salt beds and the cement employed in the construction of the well. Also let it be noted that the contaminants may be a combination of the contaminants disclosed herein.

It is a primary and fundamental purpose of our invention to have our additive of a character which will function as a control product for the colloidal and physical properties and for maintaining the required properties of a water-clay drilling mud which is thus subject to contaminants, and to so function in a more efficient and more economical manner than has before been possible.

Stated in its simplest form, this anti-contamination part of our invention and discovery involves addition to the additive of our invention (comprising the components of spent sulfite liquor prepared as herein set forth) sodium sulfate in the proportion of 1% to 50% by weight of the spent sulfite liquor components, said combination being added in proportions determined by a pilot test of a drilling mud which has encountered contaminants. The lignosulfonate in and of itself may not produce the extremely low water losses desired in some muds. The addition of the sodium sulfate will further reduce the water loss to the desired level and at the same time the lignosulfonate prevents the large rise in viscosity and gel factors which occur when sodium sulfate is added to the drilling mud. Thus in the presence of the lignosulfonate the ordinary adverse action of the sodium sulfate is depressed.

Sometimes the formations are of thick dolomitic lime or other rock sections which do not contribute good mud making materials. In such cases it is necessary to control or maintain the mud by addition daily of bentonite to develop the desired low fluid loss, and the pH of the mud is maintained on the alkaline side to promote hydration and dispersion of the drilled shales. The alkaline pH promotes higher viscosities in the bentonite clays, and, therefore, thinners are added and those with alkaline properties such as the sodium tannate type are preferred. These thinners, because of the presence of alkaline sodium salt, aid in the formation of sodium clays from the dispersed shales and also increase the degree of dispersion of the clays and shales and hence reduce the fluid loss to strata surrounding the hole. In general, the pH or alkalinity of such muds is maintained at about 9.0 to 10.0. At times the pH of the mud rises or is carried to the range of 10.5 to 11.5 in which the clays and bentonite present manifest appreciably higher viscosity. The treatment of these muds is with sodium hydroxide and quebracho, and they are referred to as "red muds." In all of these cases, the principal contaminants are salt, cement, gypsum or anhydrite, sand, and other inert mineral matter.

When the mud viscosity becomes too high, it may be more economical to convert to the so-called lime base mud rather than to dilute with water involving the necessary addition of weighting material. At other times, the contamination becomes so bad that the chemicals are not effective and it is found necessary to convert to the lime base mud. This conversion involves the addition of an excess of lime and caustic together with a thinner such as quebracho or, preferably, lignosulfonates. This type of high pH mud with an excess of lime is hereinafter referred to as a "lime base mud" as contrasted to all of the other water clay muds previously discussed, which for convenience will be hereinafter termed "fresh water muds."

*Objects.*—In general, quebracho, as a thinner, has been used in all types of muds, both fresh water and lime base, but quebracho is an expensive commodity. To date, the lignosulfonates have been useful only in lime base muds where they are well known to be relatively inexpensive, but until now, i.e., until this disclosure, it has not been possible to use the lignosulfonates in the lower pH (less than 12, i.e., fresh water) muds not containing an excess of lime, inasmuch as they have no appreciable thinning action on such muds. It is one of the purposes of this disclosure to describe products of our invention and discovery which are highly effective, not only in the lime base muds, but also in the fresh water type muds.

A primary and fundamental object is to provide a process for the modification of the original spent sulfite liquor solids in the simplest and most economical manner with relatively inexpensive equipment, and in a continuous manner to produce from these spent sulfite liquor solids a spent sulfite liquor additive which is effective in reducing the viscosity and gels of both water clay muds (fresh water muds) and the so-called lime base muds, even in the presence of substantial quantities of natural contaminants.

Another primary objective is to provide a sequence of steps whereby the spent sulfite liquor is preferably initially purified and fractionated and then modified to obtain a sulfite liquor additive which is characterized by the fact that molecules of each fraction are of a particular and different molecular average size and especially useful for dispersing agents in general and additives for drilling muds in particular.

Another primary object of our invention is to provide a process for preparing and fractionating chlorinated lignosulfonates to provide said chlorolignosulfonates in fractions of specific molecular weight to adapt the same to a particular purpose. It is particularly the object of this invention to provide means for preparing spent sulfite liquor additives that are not only especially lower in cost, but are highly effective and useful in essentially all types of water clay and oil-in-water emulsion drilling muds.

Still another object of this invention is to provide a drilling mud which can be prepared with saline or sea water when fresh water is not readily available. Mud prepared with sea water has special utility in off-shore drilling where fresh water must be transported to the drilling site and fresh water muds must be protected from sea water contamination. We have found that the additive of our invention is surprisingly effective as a thinner not only for gypsum base muds, but also for saline muds made up originally with sea water as the aqueous component together with commercial drilling mud clays.

*Defining starting materials.*—Spent sulfite liquor, because of its cheapness and large supply, is the basic raw material for our process and product. In the pulping of wood by the bisulfite process to manufacture pulp, a substantial portion (20% to 70%, usually about 55%) of the wood is converted to water soluble products which at the end of the cooking process are separated from the pulp in water solution. This solution, because of the washings, is very dilute, ranging approximately from 5% to 20% solids. This solution can be used as such in our process or it can be concentrated in any one of several well known ways to a more concentrated solution which is more readily and economically handled, particularly because of the smaller volume of liquid involved. The concentrated solution can range from 30% to 70%, but handles better in the range of 40% to 50% total solids in solution. This concentrated solution contains lignosulfonates as salts (for example calcium, magnesium, sodium, or ammonium salts, depending on which of these are employed in the digesting process), carbohydrates, and other complex organic compounds derived from wood, as well as inorganic compounds either present in the wood or derived from the reaction. Furthermore, digesting of wood by iron or aluminum bisulfite will give a spent sulfite liquor component which may be our raw material and which will obviate the necessity of a base exchange reaction to form the iron or aluminum salts. The concentrated solution may be used in our invention and it is very desirable to do so. However, the spent sulfite liquor can be furthe refined before or after processing according to our invention. For example, the spent sulfite liquor can be essentially freed of carbohydrate material by any one of a number of procedures, preferably by fermentation. Also, said carbohydrates may be removed by dialysis, precipitation with organic solvents, organic bases, or as basic lignosulfonates, for example, with lime or by salting out with salts such as calcium chloride or sodium chloride. In addition, the lignosulfonates, as well as being freed as far as possible of extraneous materials, may be fractionated as to molecular weight components by the process disclosed in the application Serial No. 437,833, entitled "Process for Separating and Fractionating Spent Sulfite Liquor Components of Pulp Digesting Processes by Organic Solvents and Preparing Useful Products Therefrom." This process employs single phase use of alcohols without precipitation of inorganic compounds of the spent sulfite liquor. Any of these products are basically derived from spent sulfite liquor solids, and the degree of refining to which they are subjected either before or after the steps of our invention will depend on the quality of product desired and the economics involved. That is, refining to some extent will improve the final properties of the final processed product, but the degree of improvement will not always be economically justifiable. In fact, it is the essential and outstanding feature of our invention and discovery that we can use concentrated spent sulfite liquor as such, and through a series of simple steps involving equipment which is relatively inexpensive, can produce products which are equivalent in properties, for instance, for use as drilling mud additives and dispersants, to the purified lignosulfonates.

In general, any type of wood which can be resolved to pulp by the sulfite process or by the iron or aluminum bisulfite process, may be used in following our invention. Furthermore, changes in the final properties of the product are influenced by the conditions of the pluping process, but in general good results are obtained using the commercial spent sulfite liquor from either paper grade quality pulp or dissolving grade quality pulp.

The raw material for such lignosulfonate for our process is spent sulfite liquor which may be the said liquor as it is received from the blow pit, or it may be in any one of a number of states or degrees of refinement and purification. We prefer, however, to use concentrated and fermented spent sulfite liquor from the pulping of wood with calcium bisulfite cooking acid—such product is available in large quantities and is considered waste, and is often considered a menace in polluting streams and other bodies of water. By "fermented" is meant spent liquor from which carbohydrates have been removed by fermentation in the production of alcohol and yeast.

Alternatively, this starting material may be refined and fractionated, but whether the spent sulfite liquor is fractionated before or after treatment according to our invention depends on economical considerations and the special product desired.

Briefly stated, our process involves treating spent sulfite liquor with a salt compound of iron, chromium, copper, and aluminum, or combinations of said salts; or treating the refined spent sulfite liquor solids with compounds of said salts; or treating the fractionated spent sulfite liquor components with said compounds of said salts.

Furthermore, the spent sulfite liquor containing said metallic salts may be subjected to oxidation which brings about changes in the constitution of the spent sulfite liquor solids resulting in additives of greatly enhanced properties comparable and superior to those of natural quebracho in the making of drilling muds.

Alternatively, the liquor containing the said metallic salts and dissolved fractionated components of said liquor may be subjected to oxidation which brings about changes in the constitution of the spent sulfite liquor components resulting in additives of greatly enhanced properties comparable and superior to those of natural quebracho in making drilling muds. Our products are superior in dispersing the ingredients of clay slips, cement, plaster, etc.

The fact that the original spent sulfite liquor may be oxidized directly and converted to the said metallic salts, forming an additive which is effective in both fresh water and lime base muds, manifests how very economical may be the products of our invention for such special uses.

In making the salts of iron, aluminum, copper, or chromium of sulfite liquor either before or after oxidation, we prefer to use the sulfates of these elements for this purpose because with calcium base sulfite liquor, calcium sulfate precipitates so that it may be removed and thereby bring about purification of the product. Higher temperature promotes the growth of larger crystals of calcium sulfate which are easier to separate from the liquor, hence it is desirable to hold the liquor after addition of the sulfate at 90°–95° C. for a period of time. The formation of large crystals is also fostered by bringing about the interaction of the salt with the spent sulfite liquor solids in such a manner that the precipitation of the calcium sulfate occurs more slowly. This objective can be accomplished by using more dilute solutions and/or using lower temperatures during the base exchange reaction. Hence, a preferred method of forming the iron, chromium, copper, and aluminum salts is to carry the reaction out at 30°–50° C. and then to heat the solution with agitation to 90°–95° C. and hold this temperature for one hour or longer. This latter treatment is also an acid treatment and has a beneficial action on the properties of the spent sulfite liquor product.

The aluminum sulfate may be added preferably in proportion equivalent to the calcium already present in the spent sulfite liquor or it can be used in smaller or greater proportions. In making such salts, we have used aluminum sulfate in the proportion of 1% to 50% on the basis of the spent sulfite liquor solids. With the other salts, i.e., iron, chromium, and copper, the range of permissible addition holds, i.e., 1% to 50%. For example, copper requires the addition of about 30% of

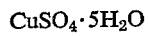

$$CuSO_4 \cdot 5H_2O$$

for complete base exchange as compared with 20% of $Al_2(SO_4)_3 \cdot 18H_2O$ which takes into consideration the usual chemical equivalence.

An excess of aluminum sulfate over the chemical equivalence improves the effectiveness of the product of our invention and discovery in respect to the conditioning of fresh water mud, but such excess has a deleterious effect on lime base muds. Thus, in short, the percentage employed depends upon the type of mud upon which it is to be used. In general, the best results have been obtained in using from 15% to 30% of aluminum sulfate $(Al_2(SO_4)_3 \cdot 18H_2O)$. The same observations apply to the use of iron, chromium, and copper salts.

When magnesium ammonium, or sodium bisulfite cooking liquor instead of calcium has been used in manufacturing the pulp, it is then desirable, but not absolutely necessary, to eliminate or partially eliminate the magnesium ammonium, or sodium ions prior to making the iron, chromium, copper, or aluminum salt. This situation can be brought about by converting to the calcium salt before proceeding with the process of our invention, or it can be accomplished by any number of procedures well known to those skilled in the art—for example, by ion exchange, dialysis with addition of acids, and base exchange procedures in general. For cations (i.e., magnesium, ammonium, or sodium) may be removed by passing the liquor through a cation exchange column in the hydrogen state, and then treated with an oxide or hydroxide of iron, chromium, copper, or aluminum. We prefer to have the lignosulfonate in the form of the calcium salts before making the iron, chromium, copper, and aluminum salts because the salts are obtained with less contamination in this manner by reason of the calcium sulfate being precipitated so it can be removed—but note well, such purified product can be obtained by procedures named immediately above. The iron, chromium, copper, and aluminum salts of the lignosulfonates thus formed are useful as drilling mud thinners in muds which do not contain an excess of lime, i.e., fresh water muds, and these products are thereby distinguished from the spent sulfite liquor products previously used as thinners in the so-called lime base muds. These previous lignosulfonate thinners which may be ammonium, sodium, magnesium, or calcium salts of lignosulfonates are operable only in the lime base muds and are not effective in muds which are sometimes termed fresh water muds, i.e., muds of low pH and which do not contain an excess of salts of aluminum, iron, copper, and chromium. The aluminum, iron, copper, and chromium salts of the spent sulfite liquor on the other hand are effective in varying degrees over the whole pH range of the fresh water muds and are also operable as thinners in lime base muds.

Furthermore, let it be noted that another alternate procedure may be used whereby the hot spent sulfite liquor is acidified and air blown or treated to remove the sulfur dioxide and then oxidized with the agents described below. By this course the spent sulfite liquor is purified of sulfur dioxide, and apparently the structure of the components of the spent sulfite liquor is modified and the oxidizing agents are conserved for performing their special functions.

In general, the important feature of our invention and discovery is that the oxidation of spent sulfite liquor components leads to increased activity or enhanced properties of said components respecting dispersing properties, and that these changed properties are manifested in the thinning of the viscosity of clay suspensions and also in the reduction of the gel-like properties of such suspensions. We have found that most oxidizing agents are operable in varying degrees as to the improvement produced. Those that we have found useful for this purpose are as follows: hydrogen peroxide, sodium peroxide, sodium or potassium persulfate, potassium and sodium permanganate, potassium and sodium dichromate, chromic acid, chlorine, and alkali metal perborates. These several agents are the preferred oxidizing agents. Also there may be employed electrolytic treatment to provide the effects of oxidation.

The oxidized products are useful as thinners, and this is particularly important because products can be prepared from the original spent sulfite liquor merely by a simple oxidation process to give products equivalent as thinners to those prepared by more complex and expensive procedures. Furthermore, let it be particularly noted, essentially in precipitation and fractionation procedures only a part of the spent sulfite liquor solids are available for use as mud thinners while, in contrast, our invention and discovery makes use of substantially all of such solids. Continuing then, if the product is to be used in other than so-called lime base drilling fluid, it is necessary to convert to the iron, aluminum, chromium, or copper salts.

The amount of oxidant required depends on the specific oxidant being used and the nature or condition of the spent sulfite liquor solids being treated. In general, from 1% to 50% of the oxidant on the basis of the dry solids in the spent sulfite liquor may be used. In the case of chlorine which is considered an oxidizing agent herein, substantially more agent can be added inasmuch as some of the chlorine reacts by substitution with the spent sulfite liquor components, so that additional chlorine is required to bring about the desired results. As stated, the character of the spent sulfite liquor solids being treated affect the amount of oxidant being used, in particular the degree to which the lignosulfonates have been previously purified and fractionated. Also, we have discovered that the molecular weight, and apparently the molecular weight distribution within the fraction will affect the quantity of oxidant required to bring about the desired result. With hydrogen peroxide, as much as 15% may be added, whereas with potassium permanganate or potassium dichromate, the spent sulfite liquor thickens rapidly to a gel when about 10% of these agents is added when a 45–50% concentrated solution of fermented spent sulfite liquor solids is being used. Such products or agents are not as suitable for additives to lime base muds, but can be used in fresh water muds. In general, the gelled materials will dissolve in alkaline solutions of pH 9 or higher and can be used under those conditions. If the spent sulfite liquor solids are fractionated as to molecular weight, it has been found that about 4% of the oxidant will gel the purified high molecular weight lignosulfonates, whereas for the low molecular weight lignosulfonate fractions, as much as 8% or more of potassium permanganate or sodium dichromate may be added without gelation in the case of the 45 to 50% concentrated liquor.

The time and temperature of the reaction is not too critical other than that the reaction should be allowed to go essentially to completion. Potassium permanganate and potassium dichromate are very rapid in their action and usually the oxidation is complete in 5 to 20 minutes. If 10% of these reagents or oxidants are added to the 40–50% concentrated liquor, the spent sulfite liquor will gel in 15 minutes at room temperature, or if the solution is hot, the gelation will occur almost immediately. With milder oxidants such as hydrogen peroxide, 15 minutes to 24 hours are necessary to bring about the completion of the oxidation. The temperature is mainly a matter of choice and convenience and is such that the reaction is complete in the time provided. The concentration of the spent sulfite liquor can be from digester strength up to 70% by weight of solids, but it is desirable to have the concentration of the liquor low to promote homogeneous reaction. However, for practical reasons, it is preferred to add the solution of the oxidant to cold spent sulfite liquor of 45% to 50% solids concentration and then to heat the solution to the temperature at which drying will be conducted. The preferred amount of the oxidant to be added is about 1% to 8% on the basis of the dry weight of the spent sulfite liquor solids present.

Special pocessing is necessary when chlorine is used as the oxidizing agent since in addition to oxidation and any other reactions which occur, there is a reaction of chlorine with the sulfite liquor components, and there are by-products from the reaction such as hydrochloric acid, which if left in the product may have a deleterious effect. For example, it has been found that on the addition of 1% to 4% of chlorine on the basis of the dry weight of the spent sulfite liquor solids, the properties of the sulfite liquor residue improve even without further purification to remove the end products formed, such as calcium chloride. The chlorination can be increased, however, up to the addition of 45% of chlorine above which the chlorinated lignin tends to become insoluble and is therefore not useful where water soluble products are desired. For products having been treated with more than 4% by weight of chlorine, it is necessary to further refine them to remove the hydrochloric acid and reaction products of hydrochloric acid. One of the best methods of accomplishing this purpose is to precipitate the chlorinated lignin with lime. This treatment has additional benefit of purifying the lignosulfonates not only of the hydrochloric acid and its end products, but also of the carbohydrates themselves. In this connection we have discovered that, whereas with regular spent sulfite liquor it is difficult to divide the lignosulfonates into several fractions by treatment with lime, surprisingly with the chlorinated lignins of our invention and discovery, the products can be divided very readily into fractions of different average molecular weight. This finding has been of extreme usefulness in the preparation of specific fractions of the chlorinated lignin as the molecular weight.

While is has been known that ligonsulfonates may be precipitated in mass from spent sulfite liquor by adding at one time relatively large quantities of lime slurry until a pH of 11–12 is reached, it is especially surprising and useful to have discovered that if the lignonsulfonates be treated with chlorine then they may be readily divided by lime precipitation into many small fractions, while at the same time purifying the lignosulfonates from the carbohydrates, chlorides, and other miscellaneous components of the sulfite liquor. These oxidized and chlorinated lignosulfonates, fractionated as to molecular weight by lime, may then be used as such as lime base mud thinners, or they may be converted to aluminum, iron, copper, and chromium salts and as such they also make highly effective fresh water drilling mud thinners. Such oxidized and chlorinated lignosulfonates may be converted to other salts such as sodium, magnesium, ammonium, etc., if calcium is objectionable in the product. Fractionation of the chlorinated spent sulfite liquor can also be accomplished by the alcohol fractionation process according to the disclosure of our application Serial No. 437,833.

In general, the products of our invention and discovery may be prepared from spent sulfite liquor and the solids therein in the condition as received directly from the digester, or said products may be prepared from modifications of the said solid components of the spent sulfite liquor. Said solids may be as follows: they may be as they exist after fermentation of the spent sulfite liquor whereby the carbohydrate content is reduced; or they may be obtained as set forth in U.S. application Ser. No. 391,116, which briefly states ". . . the spent sulfite liquor treated with an inorganic base, for example sodium hydroxide, in developing a final pH of 7–10, the same may be heated at 40° to 120° C. for a period of 30 minutes to 2 weeks, the solid organic components being maintained in solution throughout the said reaction period"; or the spent sulfite liquor may be essentially freed of carbohydrates and extraneous material by any one of a number of procedures, preferably by fermentation or by adding increments of lime, or by precipitation, dialysis, separation by organic solvents, organic bases, or precipitated as basic lignosulfonate for example with lime, or by salting out with salts such as calcium or sodium chloride.

Furthermore, the spent sulfite liquor components may have been derived by the pulping with agents other than the usual magnesium, sodium, ammonium, and calcium bisulfites. These other agents disclosed herein are iron and aluminum bisulfites.

Oxidation treatment improves the spent sulfite liquor components in providing a more effective lime mud thinner or more effective thinning and dispersing action in general, i.e., in both lime base and fresh water muds, and also for other uses such as pigment dispersion.

Base exchange to form iron, aluminum, chromium, or copper salts develops fresh water mud thinning properties, and improves some of the lime mud properties, as for example a base exchange with aluminum sulfate will yield a product with lower viscosity and gel characteristics in lime mud.

Oxidation gives improved thinning properties, while base exchange to iron, aluminum, chromium, and copper salts makes a fresh water mud thinner possible. Without the base exchange treatment a fresh water mud thinner is not obtained.

*Relative calcium sulfate contamination.*—Up to this point the disclosure has dealt primarily and especially with the treatment of the spent sulfite liquor components and with their fractionation, their treatment with metallic salts, and the oxidation of said components, as well as with the use of such spent sulfite liquor components in preparing well drilling muds in general, in establishing or proving first, that a change is made in said components by the treatment of our invention and discovery, and, second, that the magnitude of the change is surprisingly great, as evidenced by the increased and augmented effectiveness of the treated components as revealed in the preparation of such drilling muds.

Now the disclosure will relate more specifically to the particular use of the said components in providing a product for controlling the colloidal and physical properties of gypsum base drilling muds so as to maintain them in the most desirable condition for use.

As one application of our invention we provide for muds where contamination is enountered from calcium sulfate (either as so-called gyp," or in the anhydrite form) Portland cement, and similar calcium bearing material which would ". . . supply calcium ions which flocculate sodium bentonite as calcium bentonite through base exchange reaction. This flocculation of the bentonite results in an increase in the mud water loss. The water loss value of the drilling fluid may be 8 cc. at the time of entering a massive anhydrite section and 24 hours later be anywhere from 25 to 75 cc. if the mud is not treated properly. Anhydrite and cement differ in that the former supplies the sulfate radical along with the calcium while the latter supplies the hydroxyl radical which increases the fluid pH. The sulfate radical does not affect the pH of the solution although the pH of the mud may drop slightly through replacement of the hydrogen ions from the bentonite particles by the calcium. The net effect of the drilling of sufficient anhydrite to saturate the mud aqueous phase with calcium is first to result in a marked increase of gel strength followed by a gradual increase in the water loss as the bentonite is converted to the calcium bentonite. As the calcium bentonite flocculates through loss of hydration properties, the gel strength decreases. The final result is a mud of high water loss, low viscosity and low gel strength." (P.25, "Composition and Properties of Oil Well Drilling Muds," Rogers, Rev. Ed.)

In case of contamination with calcium bearing strata, Rogers further states (beginning on p. 379 of said text):

"The precipitation and removal of calcium from solution can be accomplished by at least four chemicals. These are:

(1) Bentonite.
(2) Soda ash ($Na_2CO_3$).
(3) Disodium Phosphate ($Na_2HPO_4$).
(4) Barium Carbonate ($BaCO_3$).

"The first, the use of bentonite, is not very efficient but has been used in drilling anhydrite together with large quantities of thinners. It is not recommended for large quantities of calcium sulfate and will not be discussed further.

"Soda ash is a common chemical precipitant for calcium sulfate. The reaction is:

$$CaSO_4 + Na_2CO_3 \rightarrow Na_2SO_4 + CaCO_3\downarrow$$

In this reaction the calcium is precipitated as calcium carbonate while soluble sodium sulfate is formed and remains in solution. In this reaction 1.0 pound of soda ash will precipitate 1.283 pounds of calcium sulfate. The reaction goes to completion and excess quantities of soda ash are not required. The method has two disadvantages. The first results from high pH of soda ash. The compound in strong solution has a pH of approximately 11.2. The action of high pH in gelling bentonite mixtures has been shown previously. Since the pH of the mud will increase greatly from excess soda ash it is usually customary to use SAPP as a thinner because of its low pH value. The second disadvantage results from the continuing accumulation of sodium sulfate as calcium carbonate is precipitated. Any increase in concentration of such soluble salts acts to increase the gel strength. One of the main difficulties with the soda ash treatment where thick beds of anhydrite are encountered is that the development of high gel starength from increased mud pH and sodium sulfate formation is so extensive that soda ash additions have to lag additions of thinner to reduce the mud pH and gel strength. As a result the calcium contamination continues to gain and the fluid loss continues to rise. It has been found impossible to maintain fluid-loss values below 15 cc. when using this treating method to drill massive anhydrite. Where the contamination consists of stringers of short duration, soda ash can be used to handle anhydrite satisfactorily as its extent is not sufficient to allow accumulation of sodium sulfate or the high pH condition.

"Disodium phosphate as a chemical precipitant for calcium sulfate is similar in many respects to soda ash. The reaction with anhydrite is:

$$3CaSO_4 + 2Na_2HPO_4 \rightarrow Ca_3(PO_4)_2 + 2Na_2SO_4 + H_2SO_4$$

The products of the reaction are calcium phosphate, which precipitates from solution, and sodium sulfate and sulfuric acid which remain behind as soluble constituents. In this reaction 1.0 pound of disodium phosphate will precipitate 1.430 pounds of calcium sulfate. While disodium phosphate is slightly more efficient, pound for pound, as a precipitant for calcium sulfate than is soda ash, its greater cost is a deterrent to its use for this purpose. The similarity with soda ash results from the single precipitation of the calcium with sodium sulfate as a residue. The divergence is largely in the pH difference of the two compounds. Disodium phosphate has a pH in strong aqueous solution of 8.6. The addition of this mildly alkaline compound to the mud does not result in as high gel strengths as obtained from soda ash. The residual quantities of sodium sulfate and acid act to increase the viscosity and gel strength of the mud. There are no data in the literature covering case histories of massive anhydrite drilled with this compound.

"Barium carbonate makes a satisfactory chemical precipitant when drilling massive anhydrite. The reaction is:

$$CaSO_4 + BaCO_3 \rightarrow CaCO_3\downarrow + BaSO_4\downarrow$$

In some respects this treatment is superior to that of soda ash or disodium phosphate. This results from the complete precipitation of both the calcium and the sulfate radicals of the anhydrite as well as the barium and the carbonate of the treatment, leaving no soluble salts in solution. The barium carbonate is approximately neutral in pH and this in combination with the lack of residual soluble salts allows the mud to be restored to its original condition and allows low fluid losses and viscosities to be maintained while drilling anhydrite. The principal disadvantage of the method lies in the large quantities of material required and the resulting high cost. 1.0 pound of barium carbonate will precipitate only 0.691 pound of calcium sulfate. In addition, the reaction is not very efficient as more barium carbonate must be used than called for by the reaction. Fortunately the addition of excess quantities of barium carbonate does not affect the mud adversely and overtreatment is primarily undesirable because of the cost of the barium carbonate so wasted."

Thus, all these methods of overcoming the contaminant calcium sulfate fail, or are objectionable for one reason or another.

By way of summary, it may be stated that presently three methods of treatment are commonly used in the field to overcome the deleterious effect of calcium sulfate:

(1) One method is to convert the mud to a limed mud by adding 3 to 5 pounds per barrel (a barrel being about 400 pounds) of hydrated lime, 1¼ pounds per barrel of tannin, or 2½ to 3½ pounds per barrel of calcium lignosulfonate and then adding carboxymethylcellulose and starch to control water loss. This method is not often used because it is expensive.

(2) Another method used is the employment of high pH red mud. The mud is raised to about pH 12 with equal parts of caustic and tannin, and water loss is controlled by addition of carboxymethyl cellulose. This method is also objectionable because it is expensive.

(3) A third method, and probably the most commonly used, is to convert a gypsum base mud by adding 3 to 4 pounds per barrel of gypsum. The mud is thinned to the desired viscosity with water, and 4 to 6 pounds per barrel of starch added to reduce water loss, and ¼ to ½ pound per barrel of a preservative added to prevent fermentation of the starch. This method is objectionable because it too is expensive in that by adding water the volume of the mud is increased, and therefore part of the mud must be discarded to accommodate the capacity of the equipment.

One of the outstanding features of using the product of our invention and discovery in preparing drilling muds is to provide a method of controlling mud properties against contaminants in drilling calcium sulfate bearing strata which is less expensive and requires a minimum of effort and attention at the time such a stratum is encountered in the drilling, or when contamination by such contaminants is anticipated. In fact, as shown by Example XIV, it may be only necessary to add 3 to 4 pounds per barrel of additional conditioner to the mud being used in the well at the time the anhydrite is approached. N.B. Our product is particularly relatively inexpensive.

A further outstanding feature of the use of the product of our invention is the providing of a gypsum base mud with a low gel rate—that is, a mud with a low initial gel strength so that cuttings will settle out and be removed while the mud is circulated in the mud pit, but with a sufficiently high gel strength in the quiescent state that sand and cuttings will not settle out in the well if drilling operations are temporarily interrupted for a period of time. Heretofore, gypsum base muds in common use have had high flat gels, that is, high initial and final gels. The viscosity of these muds increased as sand and fine cuttings accumulated, and it was necessary to maintain low viscosity by discarding some of the mud and bringing the remainder up to volume with water and bentonite. This treatment raised the water loss and it was necessary to add starch and carboxymethyl cellulose, which are expensive, to maintain a low water loss. By using a mud as in this invention, with a low initial gel strength without the addition of water, the cuttings nevertheless do settle out in the mud pit, and also the maintenance cost of replacing discarded mud is eliminated.

A further important feature of the use of our product is found in providing a mud resistant to gypsum contamination, which mud may be converted to an oil emulsion mud.

Still another outstanding characteristic of the use of the product of our invention and discovery is found in the providing of a mud with good thermal stability for drilling deep wells where high temperatures are encountered. Temperature can very seriously affect the necessary properties of the drilling mud, and therefore it is a very important property of the product and process of this application to provide thermal stability.

Stated in its simplest form the treatment of the drilling mud according to our invention and discovery to control calcium sulfate contamination comprises adding a lignosulfonate thinner or additive derived from spent sulfite liquor, which thinner results from the treatment of spent sulfite liquor as hereinabove described, combined with sodium sulfate, said combination being formed in proportions of 1% to 50% by weight of the sodium sulfate based on the spent sulfite liquor solids, the most advantageous proportion being determined by a pilot test to determine just the proportion necessary to meet the particular situation developed by the drilling. In place of sodium sulfate, other salts such as iron sulfate, aluminum sulfate, sodium sulfite, potassium sodium tartrate, sodium oxalate, sodium phosphate, sodium carbonate, sodium bicarbonate, and their corresponding potassium compounds, and mixtures thereof may be used. All of these compounds react with calcium sulfate to precipitate calcium and produce soluble sulfates. Regarding the use of bentonite clays, Rogers states, on page 378 of his text quoted above:

"Sodium bentonite is a highly hydrated, dispersed and ionized member of the bentonite salts and possesses good fluid-loss reducing properties. Calcium bentonite on the other hand, is poorly hydrated and dispersed and tends to flocculate. This flocculation results in fewer but larger particles which tend to precipitate. As the calcium bentonite forms in increasingly greater percentage the agglomeration of the particles and precipitation result in a decreased viscosity and gel strengths and increased fluid loss properties. The formation of calcium bentonite results in depletion of calcium in the aqueous phase unless replaced by further solution of the contaminant."

Now that the general principle of operation of our invention has been stated, we will continue to present the details of the invention in more complete form, and the following next page is useful in showing the several courses whereby products of our invention and discovery may be obtained.

Any of the above products which are salts having an element selective from the group consisting of iron, aluminum, chromium, and copper may be further treated to improve their resistance to contamination (particularly to calcium sulfate as gypsum or anhydrite) by adding a salt in the amount of 1% to 50% of the spent sulfite liquor solids selected from the group consisting of sodium sulfate, sodium sulfite, potassium sodium tartrate, sodium oxalate, sodium phosphate, sodium carbonate, sodium bicarbonate, aluminum sulfate, iron sulfate, and their corresponding potassium compounds and mixtures thereof, in providing a mud characterized by having low viscosity, low gel properties, and low water loss.

Manifestly, if the starting material was either raw spent sulfite liquor as it comes from the blow pit or if it was fermented spent sulfite liquor without further purification or fractionation, then any of the products of our invention as set forth in the above outline of the possible manifold treatments within our invention, may be further purified or fractionated by adding small increments of lime as herein disclosed or by phase separation, application Ser. No. 437,833. Let it be noted that fractionation has also important effects on the properties of the components of the spent sulfite liquor,

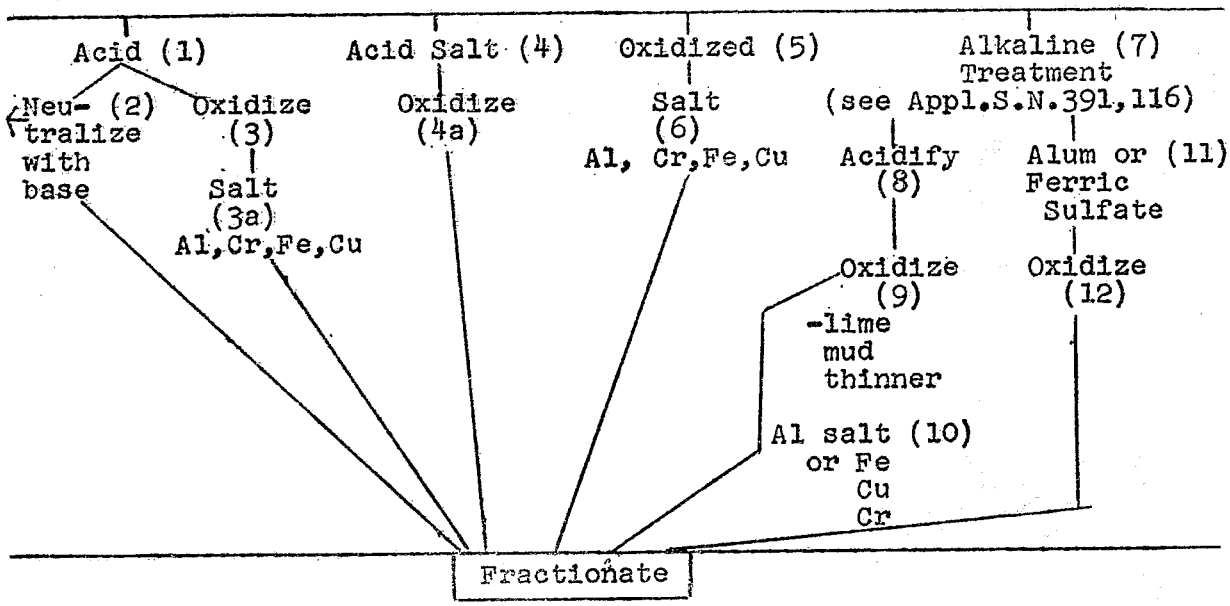

Thus, to follow through in detail, the starting material may be, as previously discussed, either the spent sulfite liquor solids as contained in the spent liquor as received from the blow pit, or these solids refined in various manners, such as by fermentation, lime precipitation, fractionation, etc. In any case, the solids to be treated are preferably concentrated to 30% to 50% solution. One method of operation, following from point (1) on the chart, is to treat the concentrated liquor with an acid and heat for 1 to 2 hours at 95° to 100° C. At this point calcium sulfate being precipitated may be separated, depending on the purity desired in the final product.

This product can be neutralized with a base such as sodium hydroxide (we mean a compound which yields hydroxyl ions in solution) to a pH above 3.5 so that it can be dried without degradation and then used as such as a limed mud thinner (2) without further treatment; or it can be further improved by oxidation, preferably with an alkaline reagent such as potassium permanganate or sodium dichromate which will yield a neutral product, as indicated at point (3) in the outline. Either product may be used as such; moreover, they can be reduced to solids by evaporation and drying. In either case, these products may be used as thinners for lime base muds. Alternatively, the product can be converted to the salt (3a) of iron, chromium, copper, and aluminum, and this is outstanding in the fact that it is operative very effectively in both fresh water and lime base muds.

Again, the acid treatment may be carried out with an acid salt such as ferric sulfate, aluminum sulfate, chromium sulfate, or copper sulfate in such proportions as to also effect a base exchange (4) and yield a product which is effective for thinning both limed muds and fresh water muds. This product may also be oxidized (4a) as was the acid-treated product (1) to obtain further improvement in mud thinning properties.

Rather than treating with an acid as in (1), the concentrated liquor may be treated directly with an oxidizing agent as (5). In this case some of the oxidizing agent is required to oxidize the sulfur dioxide which escapes in the case of acid treatment. This oxidized product may be used as a lime base mud thinner, or it may be converted to the iron, aluminum, copper, or chromium salt as in (6) and used for thinning both lime base and fresh water muds.

Another and highly effective procedure is to follow the process outlined in our application Ser. No. 391,116 involving treatment with alkali. This product (7) may then be acidified either with an acid (8) and oxidized (9), whereby a lime base mud thinner is obtained, or further processed to form the aluminum, iron, copper, and chromium salt (10). Instead of acid, aluminum, iron, copper, and chromium sulfate may be used through which an economical and effective spent sulfite liquor additive (11) is produced, the properties of which may be greatly enhanced by oxidation with any of the oxidizing agents previously mentioned, to yield (12) an extremely effective agent for conditioning drilling fluids of the fresh water, lime base, and oil emulsion types.

N.B. We have discovered that spent sulfite liquor components, or such components chemically modified in their separation from spent sulfite liquor, or in their preparation (i.e., we find that materials identified in general as lignosulfonates respond favorably to our treatment) are generally improved in their effectiveness as dispersing agents and for use in drilling muds by treating them with one or both of the following steps:

(1) Oxidizing said spent sulfite liquor components.
(2) Treating to form a salt having an element selected from the group consisting of iron, aluminum, chromium, and copper.

The order of the above steps or treatment (oxidizing or forming a salt) is immaterial.

Continuing our treatment against contamination by calcium sulfates, the product resulting from both steps 1 and 2, or the product of step 2, is treated with a salt in the proportion of 1% to 50% of the lignosulfonate solids of said spent sulfite liquor solids, selected from the group consisting of sodium sulfate, sodium sulfite, potassium sodium tartrate, sodium oxalate, sodium phosphate, sodium carbonate, sodium bicarbonate, aluminum sulfate, iron sulfate, and their corresponding potassium compounds and mixtures thereof.

*Method of testing.*—Specific examples of treatment, together with tables showing results of tests of the materials, will now be set forth. The method of making the tests is that commonly followed in the drilling industry.

The spent sulfite liquor additives of our invention may be used in many ways, but chief among these is that revealed in drilling muds. For this purpose a material is required which will bring about a lowering in viscosity of the complex clay suspension which is termed the drilling mud, and will also serve to decrease its gel strength and water loss characteristics. The accepted methods for evaluating materials to ascertain their utility for drilling muds are described in the publication entitled "American Petroleum Institute Code 29," Third Edition, May 1950— "Recommended Practice on Standard Field Procedure for Testing Drilling Fluids." This manual is prepared and published by the Americal Petroleum Institute, Division of Production, Dallas, Texas, and is used throughout the industry for testing drilling muds.

In making the laboratory tests on drilling muds according to the procedures mentioned above, it is necessary to use a clay or combination of clays. In general, clays are of extremely wide distribution in the earth's surface and are complex and difficult to define chemically. For example, H. A. Ambrose, Ph. D. and A. G. Loomis, Ph. D., state regarding drilling mud clays: ". . . analysis tells us little with respect to the properties required in drilling. There has been no correlation between chemical analysis and clays and their suitability for drilling purposes. . . ." The Science of Petroleum, volume I, page 458, 1938, Oxford University Press (London). Although clays have been divided into several classes according to their chemical and physical form, the materials encountered or used in drilling muds are mixtures of said clays and so it has become practically accepted to define these materials in terms of what is termed "yield value." According to practice then ("Principles of Drilling Mud Control," 8th edition, pages 2 and 3, published by the Americal Association of Oil Well Drilling Contractors, Dallas, 1951) clays are defined in terms of yield value, which is the number of barrels of 15 cp. mud that can be prepared from a ton of material along with water. Thus in the examples, we refer to the use of natural clay and define the "yield value" to characterize the type of clay which would give similar results.

By following the standard methods identified above and using clays of defined yield value, the efficacy of the spent sulfite liquor additives of our invention is measured in terms of initial gel strength, viscosity, ten-minute gel strength, and water loss.

*Mud test procedures.*—The following mud test procedures describe in detail the mud preparation and testing procedures used in all the examples. The clays defined in the test procedures given below were used in all examples except Examples II and III in which another but similar clay was used having a yield value of 36, that is, the clay would yield 36 barrels of 15 cp. mud per ton of clay.

*Lime mud test procedure.*—Sixty grams of a commercial rotary drilling clay with a yield value of 45 barrels of 15 centipoise mud per ton of clay were mixed with 325 milliliters of distilled water in a Hamilton Beach No. 30 "Drinkmaster" mixer for 15 minutes at 15,000 r.p.m., and then aged by rolling, i.e., agitating in pint bottles overnight at room temperature. The aged mud was "broken over" to a limed mud by adding 6 grams of calcium hydroxide, 6 milliliters of sodium hydroxide solution containing 0.25 gram sodium hydroxide per milliliter, and the spent sulfite liquor additive to be tested (each gram added equivalent to 1 pound per barrel) and mixing for 5 minutes at high speed. "Broken over" is a term used in the industry to denote the procedure and the accompanying change in properties which occur when an excess of calcium hydroxide and sodium hydroxide is added to a clay with intimate mixing as next above set forth. The mud was then returned to the bottle and again rolled overnight at room temperature, and finally mixed another 5 minutes immediately before determining viscosity, gels, and water loss by the standard procedure of the American Petroleum Institute.

*Fresh water mud test procedure.*—Thirty grams of a commercial sodium bentonite rotary drilling clay with a yield value of 92 barrels of 15 centipoise mud per ton of clay were mixed with 335 milliliters of distilled water in a Hamilton Beach No. 30 "Drinkmaster" mixer at 15,000 r.p.m. for 15 minutes and then aged by rolling overnight in pint bottles at room temperature. The spent sulfite liquor additive (each gram added equivalent to 1 pound per barrel) and sodium hydroxide to give the desired pH were then added, the mud mixed 5 minutes, and again rolled overnight at room temperature. A final 5 minute mix was made immediately before measuring viscosity, gels, and water loss by the standard methods of the American Petroleum Institute.

EXAMPLE I

This example illustrates the procedure for fractionating spent sulfite liquor by lime precipitation to obtain calcium lignosulfonate fractions with better drilling mud thinner properties than the original spent sulfite liquor.

One thousand grams of spent sulfite liquor solids in 10% water solution were heated to about 85° C. and lime slurry was added (130 grams of calcium oxide), whereupon an appreciable amount of organic precipitate was obtained. (Temperature not critical, 85° C. equals temperature of liquor as received from blow pit.) The small precipitate settled rapidly and was separated by decanting and recovered as a cake by centrifuging the thick slurry. Further fractions were recovered successively in the same manner by adding 25 gram increments of lime and removing the precipitates formed. The precipitates were washed by decantation with saturated lime water to prevent resolution by water during washing, then redissolved by adding sulfuric acid to pH 5 to 6 and dried after removing by filtration calcium sulfate. Results of the fractionation are shown in Table 1.

*Table 1 of Example 1*

FRACTIONATING OF SPENT SULFITE LIQUOR BY LIME PRECIPITATION

| Fraction No. | Cumulative Lime Added, Percent of Spent Sulfite Liquor Solids Originally Present in Solution | pH | Yield of Calcium Lignosulfonate, Percent of Spent Sulfite Liquor Solids | Diffusion Co-efficient, mm.²/day |
|---|---|---|---|---|
| 1 | 13.0 | 10.2 | 14.4 | 5.8 |
| 2 | 15.5 | 10.8 | 4.5 | 6.5 |
| 3 | 18.0 | 11.3 | 10.0 | 7.3 |
| 4 | 20.5 | 11.8 | 4.6 | 8.7 |
| 5 | 23.0 | 12.1 | 4.6 | 9.7 |
| 6 | 25.5 | 12.2 | 4.7 | 10.4 |
| | | | 42.8 | |

In redissolving, other acids than sulfuric may be used in lowering the pH of the separated precipitate and bringing about solution. It may be preferred to use an acid such as carbonic, sulfurous, or oxalic, which are characterized by giving insoluble compounds with calcium whereby excess calcium is removed from the product. In some types of drilling mud, it is desirable to have the additive as free as possible of soluble salts, so that acids such as hydrochloric and acetic which form soluble calcium salts would not be desirable, although for some purposes they could be used. Also the precipitate can be dissolved by adding a salt which gives by base exchange an insoluble calcium salt, i.e., sodium, iron, chromium, copper, aluminum, magnesium, ammonium, etc. sulfates, phosphates, oxalates, sulfites, etc. Thus the desired iron, copper, aluminum, and chromium salts can be made directly.

It will be understood that any fraction will dissolve if the pH is lowered below the pH at which it was precipitated, but the addition of sulfuric acid to provide pH 5 or 6 is helpful in giving quick solutions and approximately neutral products. Thus, we have discovered that it is possible to divide the lignosulfonates of spent sulfite liquor into several fractions by adding as the first step a relatively small or minute amount or an increment of lime, that is, 130 grams in 10,000 grams of spent sulfite liquor of 10% concentration which caused to precipitate an appreciable, i.e., recoverable, amount of organic precipitate, namely 14.4%, and also we discovered, contrary to expectations, that said amount settled out surprisingly rapidly. This precipitate was separated out as fraction No. 1. Then, as a second step a small amount or increment of lime, i.e., 25 grams (CaO) was added to the remaining solution, whereupon a second small amount, 4.5% of the original spent sulfite liquor solids, was precipitated and this likewise rapidly. This was separated. Successively the above steps were repeated until six fractions were removed.

Differences in drilling mud thinner properties of the fractions, the molecular weights of which are illustrated and identified in Table 2 of Example I.

*Table 2 of Example I*

LIMED MUD TESTS ON FRACTIONS OF SPENT SULFITE LIQUOR PREPARED BY LIME PRECIPITATION

| Fraction No. | lb./bbl. | Initial Gel., gms. | Visc. | 10 Gel., gms. | Water Loss, cc. |
|---|---|---|---|---|---|
| Original spent sulfite liquor | 4 | 100 | 29.0 | 250 | 21.9 |
| 1 | 4 | 20 | 43.2 | 30 | 16.7 |
| 2 | 4 | 0 | 15.0 | 60 | 14.0 |
| 3 | 4 | 0 | 9.8 | 40 | 14.2 |
| 4 | 4 | 0 | 11.0 | 60 | 15.0 |
| 5 | 4 | 0 | 12.3 | 100 | 15.3 |
| 6 | 4 | 10 | 14.0 | 160 | 16.2 |

Table 1 of Example I shows that the calcium lignosulfonates were fractionated into fractions of different molecular weight as shown by the diffusion coefficient data. Table 2 of Example I shows that fraction 3 was the most effective drilling mud thinner because of the greatest reduction in the properties noted which particularly means that less water is required to give a pumpable mud drilling fluid with a minimum of water loss all of which properties are of most fundamental importance in oil and gas well drilling. Of course, the fractionation may be varied by adding smaller amounts of lime to give smaller fractions characterized by having more uniform molecular weight distribution, or a fraction may be made including parts of fractions 2 and 4 in fraction 3. Thus is made most manifest the wide scope, advantages, and flexibility of our invention and discovery.

Also, this example illustrates that our invention and discovery teaches that by proper manipulation the organic precipitate can be obtained between pH 10.0 and 12.0 from spent sulfite liquor upon adding lime, and can be recovered as a number of calcium lignosulfonate fractions of different molecular weight. We also have discovered that these different fractions exhibit different improved properties, thereby making it possible to select the improved fraction in supplying a product exhibiting the exact or more nearly exact properties required for a particular application.

EXAMPLE II

To illustrate the improvement in drilling mud thinner properties obtained by chlorinating spent sulfite liquor according to our invention and discovery, samples of fermented spent sulfite liquor were concentrated to 30% solids by evaporation and then commercial chlorine gas was bubbled into the liquor until weight increases corresponding to 1, 2, 3 and 4% of the solids of the fermented spent sulfite liquor solids were obtained. Samples chlorinated with 1% and 2% chlorine had pH 3.2 and 2.6 respectively and were dried at 60° C. The 3% and 4% chlorinated samples had pH 1.4 and 1.0 respectively and were neutralized to pH 2.0 with sodium hydroxide before drying at 60° C. to avoid deterioration of the components of the spent sulfite liquor. The dried samples were tested as limed mud thinners and the results are set forth in Table 1 of Example II.

*Table 1 of Example II*

CHLORINATION OF A FERMENTED SPENT SULFITE LIQUOR

LIMED MUD TESTS USING 6 POUNDS PER BARREL

| Percent Cl₂ in Spent Sulfite Liquor | Limed Mud | | | | 10X Diesel Emulsion | | | |
|---|---|---|---|---|---|---|---|---|
| | I.G. | Visc. | 10 G. | W.L. | I.G. | Visc. | 10 G. | W.L. |
| 0 | 0 | 13.0 | 60 | 18.2 | 12 | 29.0 | 180 | 10.5 |
| 1 | 0 | 13.0 | 30 | 17.8 | 0 | 33.0 | 70 | 10.0 |
| 2 | 0 | 11.0 | 20 | 17.7 | 0 | 30.2 | 60 | 10.0 |
| 3 | 0 | 9.8 | 5 | 16.5 | 0 | 27.7 | 40 | 9.7 |
| 4 | 0 | 9.8 | 3 | 17.2 | 0 | 26.5 | 35 | 9.5 |

LIMED MUD TESTS USING 4 POUNDS PER BARREL

| 0 | 65 | 25.0 | 195 | 19.1 | Thick | | 280 | 10.7 |
|---|---|---|---|---|---|---|---|---|
| 1 | 25 | 20.0 | 110 | 17.8 | 160 | 58.0 | 280 | 10.7 |
| 2 | 20 | 18.7 | 100 | 16.8 | 160 | 61.2 | 290 | 10.7 |
| 3 | 10 | 18.7 | 90 | 16.8 | 120 | 61.5 | 250 | 10.4 |
| 4 | 7 | 20.0 | 85 | 16.8 | 110 | 64.0 | 260 | 10.4 |

In all cases of chlorinating, the pH should be adjusted by the addition of an alkali before drying to a value of more than 2.0 and less than 10.0.

Table 1 of Example II shows a progressive improvement in mud thinner properties as the percentage of chlorine is increased up to 4% chlorine. When less of the additive is added to the mud, some of the mud thinner properties of the sample chlorinated with 4% chlorine are poorer than obtained with the sample chlorinated with 3% chlorine. Thus, it becomes necessary to purify chlorinated spent sulfite liquor (i.e. for example, remove calcium chloride) when more chlorine is used than 4%, otherwise better products are not obtained.

EXAMPLE III

To illustrate the fractionation of a chlorinated spent sulfite liquor by lime precipitation a sample of spent sulfite liquor was chlorinated by bubbling in chlorine until the weight increased by an amount equal to 43% of the weight of spent sulfite liquor solids and then was recovered by lime precipitation in the same manner as described in Example I. Fractionation data are shown in the following table.

*Table 1 of Example III*

FRACTIONAL LIME PRECIPITATION OF CHLORINATED LIGNOSULFONATES FROM CHLORINATED SPENT SULFITE LIQUOR

43% CHLORINE ON THE BASIS OF THE SPENT SULFITE LIQUOR SOLIDS

| Fraction No. | pH | Yield, Percent of Spent Sulfite Liquor Solids | Cumulative Yield Percent of Spent Sulfite Liquor Solids | Diffusion Coefficient, mm.²/day |
|---|---|---|---|---|
| 1 | 5.2 | 16.7 | 16.7 | 8.2 |
| 2 | 9.6 | 41.0 | 57.7 | 9.2 |
| 3 | 11.1 | 18.7 | 76.4 | 13.8 |
| 4 | 12.0 | 6.7 | 83.1 | 15.6 |

By comparison with Table 1 in Example I it is seen that the chlorinated lignosulfonates begin precipitating at a much lower pH than the calcium lignosulfates of the original spent sulfite liquor. The resulting wide pH range of precipitation makes possible a closer control of fractionation reproducibility than is obtainable with lime precipitation of spent sulfite liquor solids.

Comparative drilling mud tests were made on the fractions of Table 1 of Example III as shown in the following table:

Table 2 of Example III

COMPARATIVE LIMED MUD THINNING PROPERTIES OF CHLORINATED LIGNOSULFONATE FRACTIONS OBTAINED BY LIME PRECIPITATION

| Sample | lb./bbl. | Limed Mud | | | | 10% Diesel Emulsion | | | |
|---|---|---|---|---|---|---|---|---|---|
| | | I.G. | Visc. | 10 G. | W.L. | I.G. | Visc. | 10 G. | W.L. |
| Original fermented spent sulfite liquor (before chlorination). | 4 | 65 | 25.0 | 195 | 19.1 | 12 | Thick | | |
| | 6 | 0 | 13.0 | 60 | 18.2 | | 29.0 | 180 | 10.5 |
| Fraction 1 | 4 | 0 | 15.5 | 20 | 15.0 | 10 | 46.0 | 240 | 9.3 |
| | 6 | 0 | 12.3 | 0 | 11.3 | 0 | 26.5 | 10 | 7.2 |
| Fraction 2 | 4 | 0 | 9.8 | 0 | 15.5 | 0 | 27.5 | 70 | 9.4 |
| | 6 | 0 | 8.7 | 0 | 10.7 | 0 | 20.0 | 15 | 7.2 |
| Fraction 3 | 4 | 0 | 11.0 | 10 | 16.9 | 0 | 25.0 | 80 | 9.8 |
| | 6 | 0 | 9.0 | 0 | 16.0 | 0 | 17.0 | 5 | 9.8 |
| Fraction 4 | 4 | 5 | 13.5 | 40 | 18.8 | 50 | 39.5 | 200 | 11.5 |
| | 6 | 0 | 8.5 | 10 | 20.8 | 0 | 20.0 | 80 | 11.6 |

The data of Table 2 of Example III show that the chlorination of the spent sulfite liquor by passing of chlorine gas through spent sulfite liquor renders the spent sulfite liquor components especially effective in conditioning lime base muds. Particularly are they effective in increasing the thinning property, as will be seen by noting the results respecting viscosity for fractions 1–4. All of said fractions are improved over the original spent sulfite liquor viscosity figure of 25.0. Fraction 2 shows a viscosity of 9.8 which is the preferred result. Thereafter, fractions 3 and 4 show an increase in viscosity which indicates that the fraction 2 gives the optimum result in lowering viscosity. Referring to the other properties of fraction 2 in comparing these with the other properties of the fractions 1, 3, and 4, it is to be noted that the properties of fraction 2 are optimum. In other words, it is not only to viscosity that fraction 2 gives optimum results, but in general to other properties. In addition, it is noted that these fractions are highly effective in producing oil emulsion type muds and whereas the optimum properties occurred with fraction 2 for the regular lime base drilling mud in making oil emulsion type lime base muds, the fraction 3 gave the greatest lowering in viscosity although fraction 2 itself was highly effective as compared with either fraction 1 or 4 or especially the original sulfite liquor.

The outstanding teaching of Table 2 of Example III is that it shows that different fractions of the spent sulfite liquor have varying properties and therefore that it is of the utmost importance, in using spent sulfite liquor where definite properties are desired, to fractionate said liquor and determine which fraction will give the best properties for the particular problem in hand. The chlorination treatment is thus seen to play a very important part in providing fractions of the spent sulfite liquor. It greatly facilitates the procuring of such fractions, and furthermore, the very important feature is revealed that the fractions of the chlorinated product are of a greatly improved character. In other words, the effectiveness of the lignosulfonate components is greatly increased by chlorination.

EXAMPLE IV

To illustrate the yields of chlorinated lignosulfonates obtained by lime precipitation purification of chlorinated spent sulfite liquor by the addition of varying amounts of chlorine to 45% fermented spent sulfite liquor, the following table is presented.

Table 1 of Example IV

SPENT SULFITE LIQUOR CHLORINATION AND RECOVERY OF PURIFIED LIGNOSULFONATES LIME PRECIPITATION YIELD

| Chlorine Used in Chlorination, Percent of Spent Sulfite Liquor Solids | Lime Precipitation Yield of Chlorinated Product,[1] Percent of Original Spent Sulfite Liquor Solids |
|---|---|
| 0 | 56 |
| 10 | 66 |
| 30 | 85 |
| 43 | 83 |

[1] Yield includes chlorine combined with spent sulfite liquor solids.

The data of Table 1 of Example IV show that for chlorine usage up to about 30% of the spent sulfite liquor solids the cost of chlorine addition is compensated by an increased yield of product in amount approximately equal to the weight of chlorine added. Moreover, such chlorine addition gives an improved product. Furthermore, the table shows that the addition of more chlorine over the 30% figure results in a loss of some of the components. This is due to the fact that above 30% addition of chlorine or thereabouts not all of the chlorine is efficiently utilized in the reaction.

In general the chlorination can be conducted in diluted, i.e. in the lignosulfonate as received from the blow pit, or in concentrated spent sulfite liquor.

EXAMPLE V

To show the improvement in drilling mud thinner properties obtained by oxidation of spent sulfite liquor samples of oxidized spent sulfite liquor prepared by the following procedure were tested as limed mud thinners. Solutions of 100 grams of spent sulfite liquor solids in 300 milliliters water were mixed cold with solutions of the various oxidizing agents to give the concentrations of oxidizing agent based on spent sulfite liquor solids shown in Table 1 of Example V. The solutions were then heated at 95° C. for one hour to insure complete reaction, dried at 60° C. in a flat shallow pan and ground to a powder for testing. The results of adding these powders to lime base muds are shown in the following table. In these experiments a lime base mud was prepared as described herein above using a clay having a "yield value" of 45. In all cases the results involve the addition of 4 pounds of the powdered product per barrel of mud.

Table 1 of Example V

EFFECT OF OXIDIZED SPENT SULFITE LIQUOR ON LIME BASED MUD

| Sample | I.G. | Visc. | 10 G. | W.L. |
|---|---|---|---|---|
| Original fermented spent sulfite liquor | 100 | 29.0 | 250 | 21.9 |
| 3% $H_2O_2$ (hydrogen peroxide) | 60 | 20.0 | 200 | 20.2 |
| 6% $H_2O_2$ | 30 | 15.0 | 150 | 20.2 |
| 2% $KMnO_4$ (potassium permanganate) | 65 | 24.0 | 230 | 18.5 |
| 4% $KMnO_4$ | 35 | 18.7 | 190 | 17.4 |
| 6% $KMnO_4$ | 7 | 16.2 | 150 | 18.4 |
| 8% $KMnO_4$ | 0 | 15.0 | 130 | 19.0 |
| 4% $K_2Cr_2O_7$ (potassium dichromate) | 85 | 25.2 | 280 | 19.6 |
| 6% $K_2Cr_2O_7$ | 15 | 20. | 170 | 17.3 |
| 8% $K_2Cr_2O_7$ | 10 | 16.5 | 150 | 17.6 |
| 12% $K_2Cr_2O_7$ | 30 | 22.5 | 190 | 15.8 |
| 4% $Na_2O_2$ (sodium peroxide) | 75 | 26.5 | 250 | 19.0 |
| 6% $Na_2O_2$ | 50 | 19.0 | 260 | 19.6 |

Table 1 of Example V shows the improvement in mud thinning obtained by oxidation with several oxidizing agents. With hydrogen peroxide and sodium peroxide a limit of improvement is reached at about 6% of oxidant after which no further improvement is observed. With permanganates and dichromates an improvement is obtained up to the point where the product begins to become less soluble in water and then poorer results are obtained. This is illustrated by the tests for 12% dichromate oxidation in Table 1 of Example V.

While a greater weight percent of potassium dichromate than of hydrogen peroxide or sodium peroxide, i.e. 8% as compared with 6%, is required to reduce the viscosity to a comparable level, the relative cost of these materials is such that the use of potassium dichromate is much more attractive economically. Furthermore, the potassium dichromate gives a greater improvement in water loss than the other oxidizing agents listed in Table 1 of Example V.

Whereas chlorine is an oxidizing agent and has been so referred to hereinabove, and it is a very inexpensive chemical relatively speaking, however its use requires further purification of the oxidized and chlorinated spent sulfite liquor solids by the use of lime precipitation. In contrast, the oxidizing agents listed in Table 1 of Example V may be used without such purification step, i.e., without resorting to the lime precipitation step. Thus, our discovery includes the use of hydrogen peroxide, potassium permanganate, potassium dichromate, sodium peroxide and other agents as set forth herein, which are characterized by their efficiency in oxidizing the components of spent sulfite liquor to give the results or mud conditioning properties.

EXAMPLE VI

As an example of the conversion of calcium base spent sulfite liquor to a mud thinner for "fresh water," or sodium bentonite muds, a solution containing 100 grams of non-volatile spent sulfite liquor solids was mixed with a solution containing 20 grams of aluminum sulfate (17% $Al_2O_3$). After filtering off the the calcium sulfate, the acidity of the solution was adjusted to pH 3.8 by adding 2.5 grams sodium hydroxide and the product dried for testing.

The ability of this aluminum salt of the spent sulfite liquor components to thin sodium bentonite at pH 9.5, i.e., a fresh water mud, is shown in the following table:

*Table 1 of Example VI*

THINNING OF FRESH WATER MUD BY CALCIUM AND ALUMINUM SALTS OF SPENT SULFITE LIQUOR

|  | I.G. | Visc. | 10 G. | W.L. |
| --- | --- | --- | --- | --- |
| Original mud | 80 | 52.5 | 170 | 9.2 |
| 1.5 lb./bbl. calcium salt | 50 | 52.5 | 170 | 8.4 |
| 1.5 lb./bbl. aluminum salt | 10 | 35.0 | 240 | 8.4 |
| 1.5 lb./bbl. quebracho | 25 | 40.5 | 130 | 7.3 |

While spent sulfite liquor as received from the blow pit contains calcium salts, nevertheless such salts provide little or no thinning action for the mud. This fact also has been observed for ammonium, magnesium and sodium salts of the lignosulfonates. On the other hand, Table 1 of Example VI shows that the aluminum salt is comparable to quebracho under the conditions of the test.

It is academic that quebracho is the preferred material for use in conditioning fresh water muds (being used to the extent of 30,000 to 40,000 tons per year for such purpose), and accordingly, to provide a product which is comparable from a waste product like spent sulfite liquor, is a meritorious contribution to the art.

While this illustration of Example VI has been directed to the contrasting properties of the aluminum salt with those of the usual so-called cooking bases, calcium, ammonium, sodium, and magnesium, similar results have been observed with the iron, copper and chromium salts as set forth in the following example, namely VII.

EXAMPLE VII

To illustrate the preparation of iron, chromium, or aluminum salts employing as the starting material the spent sulfite liquor additive of our invention (U.S. patent application Serial No. 391,116) the following samples were prepared and tested as follows:

The spent sulfite liquor additive, i.e., the additive solids, were prepared as follows: 1000 grams of concentrated calcium base spent sulfite liquor derived from paper production and having the carbohydrate removed by fermentation and having an alkalinity value about pH 4, containing 47.5 pounds of dissolved solids per 100 pounds of solution, were treated with 74 grams of sodium hydroxide solution (containing 50% by weight of sodium hydroxide) at 80° C. with mild agitation for 20 hours. The pH was then 7.9. For the preparation of each salt 211 grams of this solution was diluted with 89 cc. of water and reacted with solutions containing 20 grams of aluminum sulfate (17% $Al_2O_3$), 20 grams of ferric sulfate ($Fe_2(SO_4)_3 \cdot 9H_2O$), or 20 grams of chromium potassium sulfate ($CrK(SO_4)_2 \cdot 12H_2O$) respectively and the resulting precipitates of calcium sulfate were filtered off. The products were dried at 60° C. and tested as fresh water mud thinners using 1.5 pounds thinner per barrel of mud.

*Table 1 of Example VII*

THINNING OF FRESH WATER MUD BY ALUMINUM, IRON, COPPER AND CHROMIUM SALTS OF SPENT SULFITE LIQUOR ADDITIVE

[U.S. application Serial No. 391,116.]

| pH | Agent Added | I.G. | Visc. | 10 G. | W.L. |
| --- | --- | --- | --- | --- | --- |
| 9.5 | Original mud (no agent) | 80 | 52.5 | 170 | 9.2 |
|  | Iron salt | 7 | 30.3 | 140 | 7.0 |
|  | Chromium salt | 10 | 35.1 | 100 | 7.7 |
|  | Copper salt | 5 | 37.0 | 130 | 8.7 |
|  | Quebracho | 20 | 40.5 | 170 | 7.9 |
| 12.0 | Original mud (no agent) | Very thick—too thick to measure | | | |
|  | Aluminum salt | 50 | 63.0 | 450 | 8.7 |
|  | Iron salt | 5 | 27.7 | 150 | 7.2 |
|  | Chromium salt | 0 | 22.5 | 100 | 7.5 |
|  | Copper salt | 0 | 25.5 | 130 | 8.0 |
|  | Quebracho | 5 | 21.5 | 160 | 7.5 |

It is clear from these results that thinning action is obtained with all of these salts of the spent sulfite liquor components comparable with that of quebracho in fresh water muds at a pH of both 9.5 and 12. Although the aluminum salt does not show appreciable thinning at a pH of 9.5, it does provide substantial thinning at pH 12. The preferred salt, based on its efficiency as a thinner, is the iron salt, although in muds having a pH of 12 the chromium salt shows even more enhanced properties, i.e. it provides a product with more effective properties, particularly in that it gives a greater viscosity lowering for a given concentration.

Further, it is to be noted that whether or not these products are to be oxidized or prepared from spent sulfite liquor or oxidized spent sulfite liquors, some acidity is developed during base exchange and must subsequently be neutralized as hereinbefore described in Example VI. In this case it is therefore advantageous to add the sodium hydroxide to the spent sulfite liquor first by way of preparing our additive according to U.S. application Serial No. 391,116 which thereby provides a more desirable starting material and at the same time provides the sodium hydroxide necessary for the final neutralization.

EXAMPLE VIII

To illustrate the effect of the degree of oxidation on the fresh water mud thinning properties of iron salts of fermented spent sulfite liquor solids, a number of samples of iron salts were prepared as described in Example VII and then oxidized by heating for one hour at 95° C. with 2, 4, 6, 8 and 10% of potassium dichromate before drying at 60° C. The results of fresh water mud tests made at pH 12.0 with 0.5 pound of thinner per barrel are as follows (the pH 12 was chosen for these tests because muds of this pH are generally more difficult to thin):

Table 1 of Example VIII
EFFECT OF DEGREE OF OXIDATION OF THINNER ON FRESH WATER MUD THINNING

| Oxidation (Percent Potassium Dichromate) | I.G. | Visc. | 10 G. | W.L. |
|---|---|---|---|---|
| 0 | 80 | 53.5 | 270 | 7.5 |
| 2 | 30 | 38.0 | 180 | 7.1 |
| 4 | 10 | 34.0 | 160 | 7.1 |
| 6 | 10 | 32.6 | 190 | 7.4 |
| 8 | 15 | 31.4 | 190 | 7.5 |
| 10 | 10 | 28.0 | 200 | 7.9 |

The data of Table 1 of Example VIII shows continued decrease in mud viscosity at pH 12.0 as the degree of oxidation of the thinner increases. This result is in contrast to that shown in Table 1 of Example V for the effect of the degree of oxidation on the thinning action in lime base mud. With more than 10% potassium dichromate the solution sets up to a gel. These gels are not objectionable if the mud is conditioned to the higher pH range, i.e. above about pH 9. The percent of oxidant was not raised above 10 because the gels are not as universally applicable to various types of muds. For example, they are not as effective in lime base muds.

EXAMPLE IX

To illustrate, on the one hand, the improvement in fresh water mud thinner properties and, on the other, the poorer results obtained in limed muds by adding an excess, i.e. more than the amount of iron, aluminum or chromium sulfate necessary to base exchange the calcium in spent sulfite liquor solids oxidized with 8% of potassium dichromate by heating in solution at 95° C. for one hour, two samples of said oxidized spent sulfite liquor were prepared, one was mixed with 20% and the other with 35% by weight of aluminum sulfate (17% $Al_2O_3$). It will be noted that 20% is about equivalent for base exchange. After filtering off the precipitate of calcium sulfate, the products were dried at 80° C. and tested as fresh water and limed mud thinners. The results are shown in the following table:

Table 1 of Example IX
EFFECT OF THE AMOUNT (I.E. CONCENTRATION) OF ALUMINUM SULFATE ON THINNING PROPERTIES
FRESH WATER MUD TEST USING 0.5 LB. PER BBL. AT PH 9.5

| | I.G. | Visc. | 10 G. | W.L. |
|---|---|---|---|---|
| 20% aluminum sulfate | 15 | 40.5 | 170 | 8.7 |
| 35% aluminum sulfate | 10 | 35.3 | 170 | 9.0 |

LIMED MUD TESTS AT 4 LB. PER BBL.

| | I.G. | Visc. | 10 G. | W.L. |
|---|---|---|---|---|
| 20% aluminum sulfate | 0 | 15.0 | 110 | 20.0 |
| 35% aluminum sulfate | 20 | 33.0 | 240 | 20.0 |

It is apparent from these figures that the effect of the concentration of aluminum sulfate added in making the aluminum salt on the thinning properties of the product is different for fresh water muds than for lime base muds. In the case of fresh water muds the initial gel and viscosity are both improved, that is, lowered, whereas in the limed mud, the excess makes the properties poorer. Manifestly, if the product is to be used only in fresh water muds, the product having the excess of aluminum sulfate is preferred, but if the product is to be prepared for use optionally in either fresh water or lime base muds, then the equivalent, or the amount of aluminum sulfate necessary for base exchange of the calcium, would be preferred.

EXAMPLE X

The following examples are presented to show how different treatments of the spent sulfite liquor provide progressive, steady and positive improvement in spent sulfite liquor solids as demonstrated by their ability to decrease the viscosity and gels of drilling muds (same clay was used as in Example V above):

Table 1 of Example X
PROGRESSIVE IMPROVEMENT IN EFFECTIVENESS OF SPENT SULFITE LIQUOR PRODUCED BY DIFFERENT TREATMENTS

| Example | Description of Treatment | lb./bbl. | I.G. | Visc. | 10 Min. Gel | W.L. |
|---|---|---|---|---|---|---|
| 1 | Fermented spent sulfite liquor. | 4 | 100 | 29.0 | 250 | 21.9 |
|   |   | 6 | 10 | 13.5 |   |   |
| 2 | Spent sulfite liquor treated with alkali according to Application Ser. No. 391,116. | 4 | 65 | 24.0 | 230 | 18.5 |
|   |   | 6 | 0 | 12.3 | 70 | 18.2 |
| 3 | Selected fraction of fermented spent sulfite liquor obtained by phase separation, application Ser. No. 437,833. | 4 | 0 | 11.3 | 70 | 16.8 |
|   |   | 6 | 0 | 7.2 | 0 | 15.0 |
| 4 | Fermented spent sulfite liquor oxidized with 8% $KMnO_4$ and dried. | 4 | 0 | 15.0 | 150 | 19.0 |
|   |   | 6 | 0 | 7.2 | 5 |   |
| 5 | Fermented spent sulfite liquor oxidized with 8% $KMnO_4$ and recovered by lime precipitation. | 4 | 0 | 8.8 | 20 | 17.2 |
|   |   | 6 | 0 | 7.2 | 0 | 14.3 |

Relative Example 1: The results are given for fermented spent sulfite liquor; Relative Example 2: An improvement in the behavior of the fermented spent sulfite liquor is indicated as attained by treating this material according to the process described in application Serial No. 391,116 (see Example VII); Relative Example 3: On the other hand, fractionation of the fermented spent sulfite liquor as set forth in patent application Serial No. 437,833 (fractionation of phase separation in organic solvents) shows an even greater improvement in the mud treating properties of the product. However, this fraction represents only about 20% of the original total spent sulfite liquor solids; Relative Example 4: In definite and striking contrast, when the fermented spent sulfite liquor is treated (for one example) with 8% potassium permanganate according to the process herein set forth of our invention, substantially the whole of the spent sulfite liquor solids are converted into a product essentially equivalent to that of a fractionated product which is only 20% of the total fermented sulfite liquor solids. The results obtained with a product made in this manner are given in line 4. Thus a substantial improvement is made not only in chemical character, or properties, but also from the economical point of view, giving five times the yield of the desired product. Relative Example 5: The results are given for a product which is made by purifying fermented sulfite liquor which has been oxidized with potassium permanganate, the process for the same being as follows: Fermented spent sulfite liquor containing 100 grams of solids in 1500 milliliters of solution was oxidized by adding a 5% solution, formed of 8 grams of potassium permanganate in water. The resulting oxidized product was precipitated by adding 20 grams of calcium hydroxide as a thin slurry in water to raise the pH to 11.2, and the precipitate was removed by centrifuging, then washed with clear lime water, mixed in water, and redissolved by adding sulfuric acid to develop pH 5.5 for the solution. This solution was filtered to remove calcium sulfate, and dried at 60° C. The yield of this product was 54%.

EXAMPLE XI

To illustrate the pigment dispersion properties of the spent sulfite liquor derivatives of our invention several pigment dispersion tests were made according to a simplified version of the procedure of Daniel and Goldman. (I.E.C. Anal. Ed. 18, 26–31 (1946)). Twenty grams of pigment were mixed on a stainless steel plate with a spatula while adding a 3% solution of the sample being tested from a burette. The "wet point" at which the pigment powder first forms a putty-like mass and a "thread point" at which the mixture first flows from the spatula in long, thin strings were recorded in the following table:

*Table 1 of Example XI*

| Pigment, 20 Grams | Dispersing Agent | (Ml.) "Wet Point" | (Ml.) "Thread Point" |
|---|---|---|---|
| CaCO₃ | Water | 12.7 | 32.0 |
| | Fermented spent sulfite liquor | 9.9 | 14.2 |
| | Calcium lignosulfonate fraction diffusion coefficient=8.4 mm.²/day | 10.0 | 12.2 |
| | Diffusion coefficient=16.0 mm.²/day | 9.3 | 14.5 |
| | Potassium dichromate oxidized aluminum salt of spent sulfite liquor | 9.6 | 10.9 |
| | Potassium dichromate oxidized chromium salt of spent sulfite liquor | 9.2 | 11.3 |
| TiO₂ | Fermented spent sulfite liquor | 6.4 | 18.0 |
| | Dichromate oxidized aluminum salt of spent sulfite liquor | 6.8 | 10.0 |
| | Dichromate oxidized chromium salt of spent sulfite liquor | 6.6 | 11.5 |
| | Iron salt of spent sulfite liquor | 6.0 | 12.0 |

The results show changes in the dispersion properties as a result of the mode of treatment of the spent sulfite liquor. The change in "wet point" for calcium carbonate from 9.9 for fermented spent sulfite liquor to 9.2 for the oxidized chromium is substantial, and this improvement is also reflected in the change in the "thread point." It is also seen that the low molecular weight lignosulfonates (higher diffusion coefficient) are more effective with pigment carbonate than those of high molecular weight.

As between different pigments, there is a difference in the effectiveness as a result of the treatment. Treating titanium dioxide pigment with oxidized chromium salt of spent sulfite liquor did not provide an improvement of the "wet point," but did substantially improve the "thread point." Treating this pigment with an iron salt of spent sulfite liquor resulted in an improvement over that afforded by the oxidized chromium salt of spent sulfite liquor as respects the "wet point" but not as the "thread point."

EXAMPLE XII

To illustrate the improvement in drilling mud thinner properties obtainable by acid treatment a sample of fermented spent sulfite liquor having a pH of 4 was acidified to pH 2.0 by adding sulfuric acid and then heated for two hours at 95° C. After heating, the pH was 2.9. The product was filtered to remove calcium sulfate and a portion A was dried at 60° C. for testing. The remainder B was neutralized to pH 4 with sodium hydroxide and then dried for testing. Limed mud test results are shown in the following table:

*Table 1 of Example XII*

| Sample | #/bbl. | Limed Mud | | 10 G. | W.L. | 10% Diesel Oil Emulsion | | | |
|---|---|---|---|---|---|---|---|---|---|
| | | I.G. | Visc. | | | I.G. | Visc. | 10 G. | W.L. |
| Original spent sulfite liquor | 4 | 65 | 25 | 195 | 19.1 | Too thick to measure | | | |
| | 6 | 0 | 13.0 | 60 | 18.2 | 12 | 29.0 | 180 | 10.5 |
| A. Acid treated | 4 | 10 | 17.5 | 95 | 17.9 | 110 | 40.6 | 250 | 10.8 |
| | 6 | 0 | 11.3 | 5 | 16.7 | 0 | 27.7 | 40 | 9.3 |
| B. Acid treated and neutralized | 4 | 15 | 18.7 | 110 | 17.5 | 160 | 65.5 | 340 | 10.7 |
| | 6 | 0 | 12.3 | 20 | 16.8 | 0 | 32.9 | 50 | 9.5 |

Table 1 of Example XII shows that a marked improvement in viscosity, gel, and water loss characteristics was achieved by acidifying and heating and that this improvement persists even after neutralizing to the original pH.

Let it be noted that throughout the experiments that we can use spent sulfite liquor as it comes from the blow pit. Nevertheless, we prefer to use the fermented liquor from which the carbohydrates have been partially removed.

*Electrolytic treatment.*—The stage equivalent to oxidation of the spent sulfite liquor solids may also be brought about by electrolytic treatment, and, whereas the reactions may be deep seated and involve more than oxidation, the general effect is to bring about the properties found in the oxidizeed products as already herein described.

EXAMPLE XIII. ELECTROLYSIS

A preferred method for carrying out the electrolytic treatment is to start with a fermented calcium base spent sulfite liquor in order to take advantage of the improvements resulting from the removal of sugars by fermentation. This fermented liquor is treated with sodium hydroxide to raise the pH to approximately 8.0 and bring about precipitation of calcium sulfite which is then removed. The sodium hydroxide treatment increases the conductivity of the liquor and also produces a further improvement in the dispersing and drilling mud thinning properties as already disclosed: U.S. Serial application, No. 391,116. The liquor is then subjected to electrolysis in the anode compartment of an analytical cell at a voltage of 4 to 6 volts.

During the course of the electrolysis, the solution became acid, sodium hydroxide collected in the cathode compartment and the current decreased as the liquor conductivity decreased. The product was removed from the anode compartment when the current flow had become extremely low, and the liquor was neutralized to about pH 4 with sodium hydroxide. The solids were brought to dryness and ground to a fine powder. Laboratory tests in conditioning a lime base drilling mud with this product were conducted as follows:

Exactly 60 g. of a commercial drilling mud clay with a yield value of 45 barrels of 15 cp. mud per ton of clay was mixed with 325 cc. of distilled water for 15 minutes at a high speed on a Hamilton Beach No. 30 Drinkmaster mixer and then aged overnight by rolling in a sealed bottle at room temperature. The mud was then "broken over" by the addition of 4 g. of the electrolysis product, 6 g. of calcium hydroxide and 6 ml. of sodium hydroxide (1 ml.=0.25 g. of sodium hydroxide) and mixing for 5 minutes. The mud was then aged overnight by rolling in a sealed bottle at room temperature, again mixed 5 minutes and tested for viscosity, gels and water loss according to the standard practice of the A.P.I. (American Petroleum Institute) Code No. 29. In a further test, 10% of diesel oil was added to the mud and mixed for 20 minutes at high speed and the mud again tested according to the specified methods of the A.P.I. Code No. 29. The results of these tests on the spent sulfite liquor product before and after the electrolytic treatment are shown in Table 1 of Example XIII. The substantial and critically important improvement observed in all the properties of the mud thinned with the electrolyzed material in comparison with the properties of the mud thinned with the material prior to electrolysis are readily seen in the table. For example, in a lime mud, the final viscosity was decreased 40% as a result of the electrolytic treatment.

With reference to Table 1 of Example XIII, it will be seen that the water loss has been decreased substantially from 22.8 to 18.9 and 13.8 to 11.2, a result representing a considerable improvement over changes in water loss resulting from chemical oxidation. Such improvement would indicate that reactions other than oxidation take place in electrolytic treatment.

taminated muds with results not found possible with the known processes of the prior art. The treatment not only corrects the mud properties for the bad effects of gypsum $(Ca(SO_4) \cdot 2H_2O)$ contamination, but also renders the mud resistant to further gypsum contamination.

*Table 1 of Example XIII*

EFFECT OF ELECTROLYTIC TREATMENT ON MUD THINNING PROPERTIES OF SPENT SULFITE LIQUOR

|  | Lb. added per barrel of mud | Limed Mud | | | | 10% Diesel Emulsion | | | |
| --- | --- | --- | --- | --- | --- | --- | --- | --- | --- |
|  |  | I.G. | Visc. | 10 G. | W.L. | I.G. | Visc. | 10 G. | W.L. |
| Spent sulfite liquor additive, U.S. Serial No. 391,116 | 4 | 40 | 19.5 | 140 | 22.8 | 150 | 48.5 | 320 | 13.8 |
| Above additive after electrolytic treatment | 4 | 0 | 12.0 | 20 | 18.9 | 2 | 27.0 | 70 | 11.2 |

EXAMPLE XIV

This example is to illustrate the exceptionally improved mud characteristics obtained by the treatment of muds according to our invention and discovery as compared with treatments according to the known art. A mud prepared from a mixture of commercial drilling clays having a yield value of 45 bbls. of 15 cp. mud per ton of clay by adding 10 parts of clay solids to 100 parts of distilled water was treated for comparison purposes with various combinations of thinners, plaster of Paris.

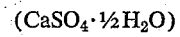

and sodium sulfate as shown in Table 1. The product of our invention (referred to as "thinner" or "additive" when used in drilling mud) was prepared as follows: Calcium base fermented spent sulfite liquor solids (100 g.) were digested for 8 hours at 90° C. in solution with sufficient sodium hydroxide to obtain a reaction product with a pH of 8.0. This product was treated by adding a solution containing 20 grams of ferric sulfate, heated to 80° C. and centrifuged to remove calcium sulfate, then a solution containing 4 grams of sodium dichromate was added, and the solution heated to 90° C. The water was removed by evaporation and the solids reduced to dryness by heating on a steam bath.

*Table 1 of Example XIV*

The first three tests in Table 1 show that the mud used was (1) not thinned, (2) thinned by quebracho and (3) by the above described thinner of our invention. When plaster of Paris is added to the base mud (test 4) a high initial gel and water loss is developed. When sodium sulfate is added to the mud of test 4 the water loss is decreased, but viscosity and gels become higher. These are the characteristic behaviors of drilling muds in the presence of these additives described in the literature on drilling muds. Tests 6 and 7 show the high initial gels and high gel rate obtained on thinning a gypsum contaminated mud with quebracho and the failure of the addition of sodium sulfate in moderate quantity in the presence of quebracho to substantially reduce initial gels and water loss. In contrast the process and product of the present invention, as shown by test 8, produces a low viscosity and initial gel as well as low gel rate in gypsum contaminated mud and also, as shown by tests 9 and 10, permits the reduction in water loss by addition of sodium sulfate even in the presence of large amounts of gypsum. In fact, as shown by test 11, on addition of more thinner the water loss of the original mud may be restored with sodium sulfate while maintaining a low gel rate and lower viscosity and gels than in the original uncontaminated mud.

Example I has demonstrated that the product and process of our invention, including the sodium sulfate part of this invention, permits treatment of gypsum con-

*Table 1 of Example XIV*

| Test No. | Thinner Added | | Plaster of Paris, lb./bbl. | Na₂SO₄, lb./bbl. | Mud Test After Aging 24 Hrs. | | | |
| --- | --- | --- | --- | --- | --- | --- | --- | --- |
|  | Name | lb./bbl. |  |  | I.G. | Visc. | 10 G. | W.L. |
| 1 | None | 0 | 0 | 0 | 10 | 39.7 | 90 | 9.0 |
| 2 | Quebracho | 0.5 | 0 | 0 | 0 | 34.0 | 30 | 9.2 |
| 3 | Thinner¹ | 0.5 | 0 | 0 | 0 | 30.5 | 30 | 9.8 |
| 4 | None | 0 | 3.0 | 0 | 95 | 34.0 | 110 | 41.9 |
| 5 | do | 0 | 3.0 | 3.0 | 150 | 71.7 | 330 | 12.0 |
| 6 | Quebracho | 2.0 | 3.0 | 0 | 50 | 30.1 | 50 | 51.0 |
| 7 | do | 2.0 | 3.0 | 2.0 | 30 | 27.5 | 30 | 36.0 |
| 8 | Thinner¹ | 2.0 | 3.0 | 0 | 0 | 9.8 | 15 | 23.0 |
| 9 | do¹ | 1.5 | 3.0 | 1.5 | 0 | 14.0 | 25 | 12.8 |
| 10 | do¹ | 1.5 | 9.0 | 1.5 | 0 | 14.0 | 25 | 12.5 |
| 11 | do¹ | 3.0 | 3.0 | 2.0 | 0 | 19.0 | 20 | 9.4 |

¹ Thinner=additive preparation described in example.

EXAMPLE XV

This example is to illustrate the use of a combination of a thinner portion of our invention and a soluble sulfate salt for drilling a well in which anhydrite is encountered as a contaminant. A mud was prepared by mixing 30 parts by weight of Wyoming bentonite having a yield value of 95 barrels of 15 cp. mud per ton of clay with 335 parts by weight of water and thinning with an additive prepared as follows:

A solution of 100 grams of fermented spent sulfite liquor solids in 125 milliliters of water was heated to 90° C. and then a solution containing 7.5 grams of sodium hydroxide in 7.5 milliliters of water was added and the solution heated for 2 hours. Next 45 grams of ferric sulfate (25 grams in excess of that required to precipitate the calcium of the spent sulfite liquor as calcium sulfate) were dissolved in water and added, and the heating continued for 1 hour. The mixture was centrifuged to remove calcium sulfate and then 4 grams of sodium dichromate were dissolved in 20 milliliters of water and the solution added to bring about oxidation. This product was neutralized to pH 4 by adding 50 grams of 10% sodium hydroxide and then dried at 60° C. and ground to a powder.

Referring to Table 1 of Example XV, test 1, the base mud is shown to be very thick, having a viscosity of 79.5 cp. and high gel strength. In drilling a well, thinners are added to maintain low viscosity and gels as drilling proceeds and the pH is usually maintained at pH 9.0 to 9.5 by addition of caustic. This "top hole" mud is represented by tests 2 and 3 in which the additive described above has been added in place of the conventional thinners, i.e., quebracho or phosphate, together with a small amount of caustic to maintain the pH at 9.0 to 9.5. When anhydrite is encountered and this mud becomes saturated with calcium sulfate a drop in viscosity and gels and a rise in water loss occurs as illustrated by test 4. This combination of changes indicates to the driller that anhydrite has been encountered and he then adds more additive to lower the water loss to the desired value as illustrated by tests 5 and 6.

It is readily apparent that this procedure is far more simple and convenient than the conventional breakover to a "gypsum base" mud in which the mud is watered back, a portion discarded, and 3 lb./barrel of plaster of Paris and 4 to 6 lb./barrel of starch together with preservative added to the remainder. A further very important fact is that the product and process of our invention for control of anhydrite contamination is far more economical.

*Table 1 of Example XV*

| Test No. | Additive, lb./bbl. | Plaster of Paris, lb./bbl. | pH | Mud Aged 24 Hours Room T. | | | |
|---|---|---|---|---|---|---|---|
| | | | | I.G. | Visc. | 10 G. | W.L. |
| 1 | Base mud | 0 | 8.9 | 170 | 79.5 | 250 | 8.8 |
| 2 | 1 | 0 | 9.4 | 15 | 39.8 | 100 | 8.2 |
| 3 | 2 | 0 | 9.3 | 0 | 39.2 | 90 | 7.8 |
| 4 | 2 | 3.0 | 8.7 | 0 | 17.5 | 20 | 15.6 |
| 5 | 4 | 3.0 | 7.8 | 0 | 22.5 | 20 | 9.7 |
| 6 | 6 | 3.0 | 7.0 | 0 | 33.0 | 40 | 7.4 |

EXAMPLE XVI

This example is to illustrate the excellent oil emulsifying properties of the additive combination of our invention in gypsum contaminated mud. The additive was prepared by mixing together 50 parts of the thinner described in Example XIV and 50 parts of sodium sulfate. For comparison, a conventional lime base mud was prepared from the same stock mud using the same amount of calcium lignosulfonate. The stock mud was made up of 60 parts of a commercial drilling clay in 325 parts of distilled water, said clay being characterized by having a yield value of 45 barrels of 15 cp. mud per ton of clay.

These two muds, a gypsum contaminated mud treated with the above-described additive and a conventional limed mud, were tested and then they were mixed with 10% of oil for 20 minutes at high speed and tested by the standard API methods for viscosity, gels and water loss.

Tests were made on the stock mud and subsequently on the treated muds before and after converting them to oil emulsion muds in order to distinguish between changes resulting from the treatment and the changes resulting from emulsification. Referring to Table 1 of Example XVI, test 2 was made by adding 4 lb./barrel of the above-described additive to a sample of the stock mud whose properties are shown in test 1 followed by a 5 minute mix and then by adding 3 lb./barrel of plaster of Paris followed by a 20 minute mix. In test 3 the conventional "breakover" procedure was followed in making a limed mud using calcium lignosulfonate. Both treated muds were aged overnight before testing.

The tests made on the treated muds before conversion to oil emulsion show the relative properties of a gypsum contaminated mud treated by the above-described additive (test No. 2, Table 1 of Example XVI) and the limed mud (test No. 3, Table 1 of Example XVI) prepared by the accepted procedure of "breakover" to a high pH calcium lignosulfonate limed mud using 4 lb./barrel of chemical in each case. These results are important in evaluating the emulsion forming properties. It should be noted that the water loss of the gypsum contaminated mud (test 2) is lower than that of the base mud (test 1) while the limed mud (test 3) has a higher water loss. Also the viscosity and gels of the gypsum contaminated mud are higher than those of the limed mud. The viscosity of the gypsum contaminated mud can be reduced by adding water without appreciable change in the water loss.

The emulsifying properties of the additives used must be evaluated for drilling mud purposes on the basis of changes in viscosity, gels, and water loss because both emulsions show no break on standing. In this case, on mixing for 20 minutes with 10% of oil, the viscosity of the additive treated gypsum contaminated mud (test 2) decreased by a factor of about 0.7 while the viscosity of the limed mud (test 3) increased by a factor of about 2.2. Similarly, the water loss of the additive treated mud decreased 38% while the water loss of the limed mud decreased 31%. Thus the oil emulsifying properties of the additive in gypsum contaminated mud are approximately the same as those of calcium lignosulfonate in limed mud. In the oil well drilling industry calcium lignosulfonate is considered to be an excellent emulsifier for oil in limed muds.

The excellent oil emulsion properties of the above-described additive together with the high stability and low alkalinity make this additive very attractive for preparing oil emulsion muds resistant to gypsum. As shown by the example, a much lower water loss will also be realized with many muds at the same thinner and oil usage.

*Table 1 of Example XVI*

| Test No. | Treatment | pH | Treated Mud | | | | 10% Oil Emulsion | | | |
|---|---|---|---|---|---|---|---|---|---|---|
| | | | I.G. | Visc. | 10 G. | W.L. | I.G. | Visc. | 10 G. | W.L. |
| 1 | Stock mud | 8.7 | 80 | 28.0 | 130 | 13.0 | | | | |
| 2 | 4 lb./bbl. additive, 3 lb./bbl. plaster of Paris and NaOH to pH 7.9 | 7.9 | 30 | 21.3 | 80 | 9.2 | 100 | 15.0 | 190 | 5.7 |
| 3 | 4 lb./bbl. calcium lignosulfonate, 6 lb./bbl. calcium hydroxide and 1.5 lb./bbl. sodium hydroxide | 12.5 | 0 | 12.3 | 60 | 15.8 | 20 | 26.8 | 190 | 10.9 |

EXAMPLE XVII

This example is to illustrate the thermal stability of "gypsum" base muds. The base mud of Example XV was treated with gypsum together with the additive described in Example XVI to make a "gypsum" base mud. (The mud was aged 24 hours at room temperature before testing and heating.) Samples of the aged mud were then heated in a sealed bomb at 340° F. for various lengths of time. After heating the bomb was cooled and the mud removed and mixed before testing. Test results are shown in Table 1.

Referring to Table 1 of Example XVII, with 4 lb./barrel of additive (tests 1 and 3), the viscosity dropped from 28.5 to 22.4 cp. and the water loss increased from 9.0 to 11.0 milliliters during the first 4 hours of heating at 340° F., after which the viscosity increased slightly and the water loss increased from 11.0 to 12.7. With 6 lb./barrel of additive the water loss was much more stable, increasing only 1.7 milliliters in 20 hours. In contrast, all high pH limed muds prepared with calcium lignosulfonate became too thick to measure and had a water loss above 30 milliliters after 2 to 3 hours of heating at 340° F.

Table 1 of Example XVII

| Test No. | Additive, lb./bbl. | Plaster of Paris, lb./bbl. | Initial pH | Heated at 340° F. | | | | |
|---|---|---|---|---|---|---|---|---|
| | | | | Hrs. Heated | I.G. | Visc. | 10 G. | W.L. |
| 1 | 4.0 | 3.0 | 6.7 | 0 | 0 | 28.5 | 100 | 9.0 |
| 2 | 4.0 | 3.0 | 6.7 | 4.0 | 0 | 22.5 | 80 | 11.0 |
| 3 | 4.0 | 3.0 | 6.7 | 20.0 | 0 | 25.2 | 40 | 12.7 |
| 4 | 6.0 | 3.0 | 5.9 | 0 | 0 | 38.0 | 70 | 7.6 |
| 5 | 6.0 | 3.0 | 5.9 | 20.0 | 0 | 35.2 | 70 | 9.3 |

EXAMPLE XVIII

This example is to illustrate the use of a chemical which will react with calcium sulfate to form a soluble sulfate and a calcium salt less soluble than calcium sulfate in conditioning a gypsum contaminated mud; for example, sodium oxalate.

The Wyoming bentonite mud described in Example XV was treated with the thinner described in Example XIV together with sodium oxalate and plaster of Paris. The sodium oxalate added reacts with an equal weight of calcium sulfate to form sodium sulfate and calcium oxalate.

Referring to Table 1 of Example XVIII, the base mud (test 1) yields a gypsum base mud of high water loss (test 2) when plaster of Paris is added. The addition of 4 lb./barrel of thinner lowers the water loss (test 3) but not to a value usually considered satisfactory for most drilling operations. The subsequent addition of sodium oxalate (test 4) further lowers the water loss to a satisfactory level. Test 5 shows that the water loss remains the same or even goes down when more calcium sulfate is added to compensate for that removed by reaction with sodium oxalate.

Table 1 of Example XVIII

| Test No. | Thinner, lb./bbl. | Sodium Oxalate, lb./bbl. | Plaster of Paris, lb./bbl. | pH | Mud Aged 24 Hrs. at Room Temp. | | | |
|---|---|---|---|---|---|---|---|---|
| | | | | | I.G. | Visc. | 10 G. | W.L. |
| 1 | (¹) | (¹) | (¹) | 8.9 | 170 | 79.5 | 250 | 8.8 |
| 2 | 0 | 0 | 3.0 | 8.6 | 40 | 22.5 | 60 | 27.2 |
| 3 | 4.0 | 0 | 3.0 | 5.7 | 0 | 20.0 | 20 | 13.0 |
| 4 | 4.0 | 1.5 | 3.0 | 6.7 | 0 | 32.5 | 40 | 8.1 |
| 5 | 4.0 | 1.5 | 6.0 | 6.9 | 0 | 32.5 | 40 | 7.6 |

¹ Base mud.

EXAMPLE XIX

This example illustrates how a mud thickened and unusable as a result of salt contamination may be treated with the product of our invention to condition the mud to a desirable and fully usable drilling fluid, and how this result cannot be attained with the most widely used thinners, quebracho, tannin, or lignite.

A field mud was obtained from an oil well drilling operation in California before chemical treatment was started at the well. Its characteristics are given in the following table. This mud was contaminated with 1% of salt by adding 3.5 lb./barrel of salt to the mud (usually considered the upper limit of salt contamination) and then samples were treated with the product of our invention as described in Example XIV, with quebracho, and with lignite, together with caustic to maintain a pH of 8 or 9.

Referring to Table 1 of Example XIX, test 1 shows the viscosity, gel and water loss factors of the mud as taken from the oil well, and test 2 shows the same factors after adding 3.5 lb./barrel of salt. In tests 3, 4, 5, and 6 the addition of the thinner of our invention in increasing amounts reduces viscosity, gel, and water loss factors until at 4 lb./barrel of said thinner the mud properties are essentially the same as before contamination with salt. In tests 7, 8, 9, and 10 the addition of the same quantities of quebracho failed to restore the contaminated mud to low viscosity and gel factors. In fact, continued addition of quebracho thickened the mud. Tests 11, 12, 13, and 14 show that lignite added in the same quantities also does not thin the contaminated mud to the low viscosity and gels obtained with the product of our invention.

Thus the test results presented in Table 1 of Example XIX show that the product of our invention is more resistant to salt contamination in drilling muds than either quebracho or lignite.

Table 1 of Example XIX
THINNING OF A MUD CONTAMINATED WITH 1% SALT

| Test No. | Thinner | lb./bbl. | Initial Mud | | | Rolled Overnight at 150° F. | | | | |
|---|---|---|---|---|---|---|---|---|---|---|
| | | | pH | I.G. | Visc. | pH | I.G. | Visc. | 10 G. | W.L. |
| 1 | Base mud before contamination | | | | | 8.6 | 0 | 15.0 | 10 | 11.6 |
| 2 | Base mud after contamination | | 8.7 | 170 | 83.5 | 8.3 | 125 | 72.0 | 200 | 16.8 |
| 3 | Thinner | 0.5 | 9.8 | 100 | 45.0 | 8.5 | 65 | 54.0 | 125 | 15.0 |
| 4 | do | 1.0 | 9.0 | 40 | 35.7 | 8.5 | 35 | 44.5 | 90 | 14.7 |
| 5 | do | 3.0 | 8.7 | 3 | 18.5 | 8.4 | 5 | 19.7 | 35 | 12.9 |
| 6 | do | 4.0 | 8.6 | 2 | 18.5 | 8.4 | 2 | 17.7 | 30 | 12.6 |
| 7 | Quebracho | 0.5 | 8.7 | 140 | 64.0 | 8.5 | 45 | 43.7 | 95 | 15.0 |
| 8 | do | 1.0 | 8.5 | 70 | 35.7 | 8.3 | 45 | 43.7 | 105 | 15.6 |
| 9 | do | 3.0 | 8.3 | 20 | 28.0 | 8.2 | 60 | 59.5 | 150 | 16.5 |
| 10 | do | 4.0 | 8.1 | 25 | 28.8 | 8.0 | 55 | 61.5 | 160 | 16.2 |
| 11 | Lignite | 0.5 | 8.8 | 135 | 64.8 | 8.4 | 70 | 59.0 | 155 | 15.0 |
| 12 | do | 1.0 | 8.7 | 95 | 45.0 | 8.4 | 45 | 55.0 | 95 | 15.0 |
| 13 | do | 3.0 | 8.3 | 70 | 35.2 | 8.0 | 20 | 47.6 | 90 | 13.8 |
| 14 | do | 4.0 | 8.0 | 80 | 35.7 | 7.8 | 20 | 43.7 | 80 | 13.8 |

EXAMPLE XX

*Mixtures of additive and complex phosphates.*—The complex phosphates are in general use for the conditioning of fresh water drilling muds and it is generally known that the pH range of 8 to 9 is optimum for their use. Above the pH of 9 the viscosity of the treated mud rises appreciably for a given usage of the phosphate. Also, at higher pH values the complex phosphates deteriorate and lose their effectiveness. Phosphates are also unstable at the higher temperatures encountered in deep wells. It was surprising to find then that mixtures of from 5 to 25 percent of complex phosphates with the additive of our invention gave viscosities appreciably lower than those obtained with either of these thinners alone. That is, minimum viscosity in a bentonite mud was obtained by the use of a combination thinner containing about 10% of a complex phosphate and 90% of the additive of our invention. Furthermore, it was observed that the combination of additive and complex phosphate was thermally stable as compared with the phosphate alone.

To illustrate the unusually low viscosities obtained in drilling muds by use of combinations of the additive of our invention with the complex phosphates, a synthetic drilling mud was prepared and treated with mixtures of the additive with various proportions of the complex phosphates ranging from 10 to 60% of the complex phosphate. The complex phosphates examined are as follows: Sodium pyrophosphate, sodium tetraphosphate, sodium hexametaphosphate, sodium acid pyrophosphate, and sodium tripolyphosphate.

The mud was prepared by mixing 30 parts by weight of Wyoming bentonite (having a yield value of 95 barrels of 15 cp. mud per ton of clay) with 335 parts by weight of distilled water for 15 minutes at high speed and aged by rolling in sealed bottles for 24 hours before use.

The additive was prepared by mixing 200 grams of fermented calcium base spent sulfite liquor previously evaporated to 50% by weight of the nonvolatile solids with a solution of 20 grams of ferric sulfate in 50 milliliters of distilled water and then adding with vigorous stirring a solution of 40 grams of sodium bichromate in 20 milliliters of distilled water. The mixture was then heated at 90° C. for two hours, centrifuged, to remove the precipitate of calcium sulfate, and the resulting clear liquor evaporated to dryness on a steam bath at approximately 70° C. The dried additive was then ground to a powder and mixed with the powdered complex phosphates in various proportions to yield the mixtures used in the following tests.

The mixtures of complex phosphates and additive were tested in the above described mud as follows: The dry mixture was added to the aged mud together with sufficient caustic solution (1.0 ml.=0.25 g. NaOH) to give a pH of approximately 9.5 and the mud mixed for 5 minutes at high speed. This thinned mud was then aged overnight by rolling in a sealed bottle at room temperature, again mixed 5 minutes, and tested for viscosity, gels, and water loss by the methods recommended in API Code 29. The muds were then replaced in the sealed bottles, rolled for 24 hours at 150° F., and again tested according to the method of API Code 29. Results of the tests are illustrated in Figure 1 of Example XX.

Referring to Figure 1 it is readily seen that a combination of the above described additive with any one of the 5 complex phosphates commonly used as drilling mud thinners in such proportions that the mixture contains 5% to 20% of the complex phosphates will produce a lower mud viscosity even after thermal aging, than either component used alone. Furthermore the resulting viscosity is lower than obtained with an equivalent amount of quebracho.

EXAMPLE XXI

*Combination of tannins and additives.*—It was surprising to find that in the case of four different natural tannin extracts currently used in conditioning fresh water drilling muds the combination of about 5% to 25% of any of these tannin extracts with the additive of our invention gave a product which was more efficient in lowering the viscosity of the fresh water drilling mud than either the extract or the additive alone.

The following example illustrates the more efficient action of the combination of tannin with the additive of our invention than either the tannin extract or the additive alone in fresh water drilling mud. While the relative effect varies somewhat with the pH of the mud, the concentration of the combination thinner in the mud, and also where as minimum viscosities were observed for the different tannin extracts over a range of about 5% to 25%, the following example is presented for a mixture of 10% of tannin extract and 90% of the additive of our invention by way of example. The additive of our invention used in this example is the same as that described in Example XX (combination of additive and phosphates), furthermore the entire experiment is carried out in the same way as described in Example XX except that the additive of our invention was mixed with the tannin extracts instead of the phosphates. Commercial tannin extracts from quebracho, redwood bark, hemlock bark and eucalyptus were used in the proportion of 90% of the additive of our invention and 10% of the solid extract. The muds were prepared and tested exactly as described in the Example XX. The results of the tests are summarized in Table 1 of Example XXI, following:

*Table 1 of Example XXI*
EFFECT OF COMBINATION OF TANNIN EXTRACTS WITH ADDITIVE OF OUR INVENTION ON MUD VISCOSITY
[Mud tests made in Wyoming bentonite mud at pH 9.5, at 1.0 lb./bbl. of thinner]

| Tannin Extract in Mixture | Viscosity in centipoises of Mud at pH 9.5 | | |
|---|---|---|---|
| | Tannin Extract Only | 90% Thinner, 10% Tannin Ext. | Thinner Only |
| Quebracho | 51.0 | 46.0 | 48.0 |
| Redwood bark | 53.5 | 43.0 | 48.0 |
| Hemlock bark | 53.5 | 45.7 | 48.0 |
| Eucalyptus | 50.0 | 45.5 | 48.0 |

Thus is can be seen from the table that when tannin extracts alone are used in this bentonitic mud the viscosities attained with one pound per barrel of the tannin extracts are greater than 50 cp. excepting only eucalyptus and with the additive only of our invention the viscosity is about 48 cp. whereas with the combination of about 10% of the tannin extract with the additive of our invention, viscosity in the same mud ranges from 43 to 46 cp. with the different tannin extracts.

EXAMPLE XXII

To illustrate the preparation of drilling muds from saline water, and the unexpected properties of these muds in the presence of salt obtained by the use of the addition of the product of our invention, a mud was prepared using sea water and commercial drilling clays and conditioned by the addition of the additive described in Example XIV.

The mud was prepared by slowly stirring 20 grams of calcium carbonate, 145 grams of a commercial drilling clay having a yield value of 95 barrels of 15 cp. mud per ton of clay, and 874 grams of a commercial drilling clay having a yield value of 45 barrels of 15 cp. mud per ton of clay into 4000 milliliters of sea water taken from Puget Sound. The mud was mixed slowly for one hour and then divided into 500 milliliter portions. These portions were each mixed for one-half hour at 15,000 r.p.m. on a Hamilton Beach No. 30 "Drinkmaster" mixer, and then recombined and allowed to age several days in a Pyrex bottle. The aged mud was then thoroughly mixed and divided into 350 milliliter portions for mud tests.

Two series of tests were carried out. In one series the sea water mud was treated as a fresh water mud and additive or thinner, together with sufficient caustic (1.0 milliliter equivalent to 0.25 gram sodium hydroxide) to adjust the pH to 9.5, was mixed into the mud and the mixing continued for 5 minutes at 15,000 r.p.m. in a Hamilton Beach No. 30 "Drinkmaster" mixer. The thinned mud was aged by rolling overnight in a sealed pint bottle, readjusted to pH 9.5 by adding caustic, mixed 5 minutes at 15,000 r.p.m., and tested immediately for viscosity, gels, and water loss according to the procedure recommended in the American Petroleum Institute Code 29.

In the second series of tests, the mud was converted to a "gyp" mud by adding 5 lbs./barrel of plaster of Paris together with the additive or thinner and mixing for 20 minutes at 15,000 r.p.m. These muds were adjusted to pH 8.2 and aged and tested as described above. The results for both series of tests are presented in Table 1 which follows:

Referring to Table 1, comparison of tests 2 to 6 with test 1 shows that the additive of our invention effectively lowers viscosity, gels and water loss of the sea water mud whereas the addition of quebracho (tests 7 to 10) has very little effect on viscosity and gels, and even permits the water loss to increase. Good reduction in viscosity, gels and water loss was also obtained when the mud was converted to a gypsum base mud by adding 5 lbs./barrel of plaster of Paris (test 11), and treated with various amounts of the additive of our invention (tests 12 to 16). In contrast, the addition of quebracho produced an increase in viscosity and water loss (tests 17 to 19). Tests 20, 21 and 22 show the especially desirable low water loss attained by making larger additions of the additive to the saline mud of test 1.

for Improving the Effectiveness of the Components of Spent Sulfite Liquor and the Products Thereof," filed June 1, 1954.

We claim:

1. A two-chemical process of producing useful products from sulfonated lignin containing material comprising reacting sulfonated lignin containing material to form a salt of said sulfonated lignin containing material having a cation selected from the group consisting of iron, aluminum, chromium, and copper, and combinations thereof; and oxidizing the said salt of the sulfonated lignin containing material forming a soluble product by an oxidizing agent having an oxidizing power stronger than an oxidation potential of about −1.3.

*Table 1 of Example XXII*
PREPARATION AND CONDITIONING OF A SEA WATER MUD

| Test No. | Thinner | lb./bbl. | Plaster of Paris, lb./bbl. | pH | Aged 24 Hrs. Room Temp. | | | |
|---|---|---|---|---|---|---|---|---|
| | | | | | I.G. | Visc. | 10 G. | W.L |
| 1 | Base mud | | 0 | 9.5 | 100 | 39.5 | 130 | 30.2 |
| 2 | Additive | 2 | 0 | 9.5 | 60 | 35.2 | 90 | 27.0 |
| 3 | Additive | 4 | 0 | 9.5 | 30 | 29.5 | 70 | 21.0 |
| 4 | Additive | 6 | 0 | 9.5 | 0 | 20.0 | 70 | 14.4 |
| 5 | Additive | 10 | 0 | 9.5 | 0 | 17.5 | 30 | 7.8 |
| 6 | Additive | 15 | 0 | 9.5 | 0 | 17.5 | 5 | 4.8 |
| 7 | Quebracho | 2 | 0 | 9.4 | 70 | 46.0 | 100 | 33.0 |
| 8 | Quebracho | 4 | 0 | 9.5 | 60 | 35.2 | 70 | 36.8 |
| 9 | Quebracho | 6 | 0 | 9.5 | 50 | 34.0 | 70 | 37.5 |
| 10 | Quebracho | 10 | 0 | 9.4 | 50 | 35.2 | 80 | 34.5 |
| 11 | Base "GYP" mud | | 5 | 8.2 | 70 | 30.1 | 120 | 28.6 |
| 12 | Additive | 2 | 5 | 8.2 | 50 | 29.0 | 90 | 25.0 |
| 13 | Additive | 4 | 5 | 8.2 | 30 | 24.0 | 80 | 20.8 |
| 14 | Additive | 6 | 5 | 8.2 | 15 | 23.5 | 70 | 14.5 |
| 15 | Additive | 10 | 5 | 8.3 | 0 | 25.2 | 80 | 6.4 |
| 16 | Additive | 15 | 5 | 8.2 | 0 | 22.5 | 20 | 3.8 |
| 17 | Quebracho | 2 | 5 | 8.2 | 60 | 30.5 | 90 | 31.5 |
| 18 | Quebracho | 4 | 5 | 8.2 | 60 | 32.5 | 90 | 34.0 |
| 19 | Quebracho | 6 | 5 | 8.2 | 60 | 35.2 | 70 | 35.0 |
| 20 | Additive | 20 | 0 | 9.3 | 0 | 22.5 | 5 | 3.1 |
| 21 | Additive | 30 | 0 | 9.5 | 0 | 28.0 | 0 | 2.1 |
| 22 | Additive | 40 | 0 | 9.5 | 0 | 30.0 | 0 | 1.3 |

By "purifying" herein is meant partially or completely removing the nonlignosulfonate portions of the spent sulfite liquor as by fermentation, fractionation, lime precipitation in bulk or by small increments, by salting out, or by reaction with organic amines and separation as precipitates or as non-miscible solutions; in short, by any of the methods known to the art. In fractionating we include fractionation with aqueous organic solvents. By "separating" the spent sulfite liquor solids is meant isolating in whole or in part the said solid components of the spent sulfite liquor by any of the methods herein disclosed. By "concentrating" the spent sulfite liquor solids is meant reducing the volatile content of the spent sulfite liquor in part or to the degree that there remain only the solid components of the spent sulfite liquor.

When the phrase "adding to the spent sulfite liquor solid components" is used, the solids could be in the original solution or isolated by any of the methods herein mentioned or known to the art. When the statement is herein used "treating to form a salt having an element selected from the group consisting of iron, aluminum, chromium, and copper," it is intended, of course, to include combinations of said elements. Likewise, in the listing of the oxidizing agents, combinations of said agents where chemically feasible are included. When it is directed to "add to" or "treat spent sulfite liquor" it is intended to employ or treat said liquor substantially as received from the digester excepting that the temperature of the spent sulfite liquor may be as it is received from the digester or after the spent sulfite liquor is cooled.

In using a gypsum base mud, the calcium sulfate may be added to the mud from the strata being drilled.

Where examples of substances are given, it is to be understood the same is done by way of illustration and not limitation.

This application is a continuation-in-part of our copending application Ser. No. 433,794, entitled "Process 2. A two-chemical process of producing useful products from sulfonated lignin containing material comprising reacting sulfonated lignin containing material to form a salt of said sulfonated lignin containing material having a cation selected from the group consisting of iron, aluminum, chromium and copper, and combinations thereof; and oxidizing the said salt of the sulfonated lignin containing material forming a soluble product by an oxidizing agent selected from the group consisting of hydrogen peroxide, alkali metal dischromate, alkali metal permanganate, alkali metal persulfate, chromic acid, chlorine, alkali metal perborate, and electrolytic oxidation.

3. A two-chemical process of producing useful products from sulfonated lignin containing material comprising reacting sulfonated lignin containing material to form a salt of said sulfonated lignin containing material having a cation selected from the group consisting of iron, aluminum, chromium and copper, and combinations thereof; and oxidizing the said salt of the sulfonated lignin containing material forming a soluble product by alkali metal dichromate.

4. A two-chemical process of producing useful products from sulfonated lignin containing material comprising reacting sulfonated lignin containing material to form a salt of said sulfonated lignin containing material having iron as the cation; and oxidizing the salt of the sulfonated lignin containing material forming a soluble product by alkali metal dichromate.

5. A two-chemical process of claim 1 further comprising forming said salt by adding to said sulfonated lignin containing material a salt selected from the group of iron sulfate, aluminum sulfate, chromium sulfate, copper sulfate and mixtures thereof, said salt being added in excess of the amount required for base exchange.

6. A two-chemical process of producing useful products from sulfonated lignin containing material comprising reacting sulfonated lignin containing material to form a salt of said sulfonated lignin containing material having a cation selected from the group consisting of iron, aluminum, chromium, and copper, and combinations thereof; and oxidizing the said salt of the sulfonated lignin containing material forming a soluble product by hydrogen peroxide.

7. A two-chemical process of producing useful products from sulfonated lignin containing material comprising reacting sulfonated lignin containing material to form a salt of said sulfonated lignin containing material having aluminum as the cation; and oxidizing the said salt of the sulfonated lignin containing material forming a soluble product by hydrogen peroxide.

8. A two-chemical process of claim 2 further comprising forming said salt by adding to said sulfonated lignin containing material a salt selected from the group of iron sulfate, aluminum sulfate, chromium sulfate, copper sulfate and mixtures thereof, said salt being added in excess of the amount required for base exchange.

9. A two-chemical process of producing useful products from sulfonated lignin containing material comprising reacting sulfonated lignin containing material to form a salt of said sulfonated lignin containing material having a cation selected from the group consisting of iron, aluminum, chromium and copper and combinations thereof; and oxidizing the said salt of the sulfonated lignin containing material forming a soluble product by electrolytic oxidation.

10. A two-chemical process of producing useful products from sulfonated lignin containing material comprising reacting sulfonated lignin containing material to form a salt of the sulfonated lignin containing material having iron as the cation; and oxidizing the said salt of the sulfonated lignin containing material forming a soluble product by electrolytic oxidation.

11. A two-chemical process of claim 3 further comprising forming said salt by adding to said sulfonated lignin containing material a salt selected from the group of iron sulfate, aluminum sulfate, chromium sulfate, copper sulfate and mixtures thereof, said salt being added in excess of the amount required for base exchange.

12. A two-chemical process of producing useful products from sulfonated lignin containing material comprising reacting sulfonated lignin containing material to form a salt of said sulfonated lignin containing material having a cation selected from the group consisting of iron, aluminum, chromium and copper, and combinations thereof; and oxidizing the said salt of the sulfonated lignin containing material forming a soluble product by an alkali metal permanganate.

13. A two-chemical process of producing useful products from sulfonated lignin containing material comprising reacting sulfonated lignin containing material to form a salt having iron as the cation and oxidizing the said salt of the sulfonated lignin containing material forming a soluble product by an alkali metal permanganate.

14. The product of the process of claim 1.

15. The product of the process of claim 2.

16. A two-chemical process of producing useful products from sulfonated lignin containing material obtained from spent sulfite liquor, comprising reacting sulfonated lignin containing material obtained from spent sulfite liquor to form a salt of said sulfonated material having a cation selected from the group consisting of iron, aluminum, chromium and copper, and combinations thereof; and oxidizing the said salt of said sulfonated material forming a soluble product by an oxidizing agent selected from the group consisting of hydrogen peroxide, alkali metal dichromate, alkali metal permanganate, alkali metal persulfate, chromic acid, chlorine, alkali metal perborate and electrolytic oxidation.

17. A two-chemical process of producing useful products from sulfonated lignin containing material obtained from spent sulfite liquor comprising reacting sulfonated lignin containing material obtained from spent sulfite liquor to form a salt of said sulfonated lignin containing material having a cation selected from the group consisting of iron, aluminum, chromium and copper, and combinations thereof; and oxidizing the said salt of said sulfonated material forming a soluble product by alkali metal dichromate.

18. A two-chemical process of producing useful products from sulfonated lignin containing material obtained from spent sulfite liquor comprising reacting sulfonated lignin containing material obtained from spent sulfite liquor to form a salt of said sulfonated material having iron as the cation; and oxidizing the salt of said sulfonated material forming a soluble product by alkali metal dichromate.

19. A two-chemical process of producing useful products from sulfonated lignin containing material obtained from spent sulfite liquor comprising reacting sulfonated lignin containing material obtained from spent sulfite liquor to form a salt of said sulfonated material having a cation selected from the group consisting of iron, aluminum, chromium and copper and combinations thereof; oxidizing the said salt forming a soluble product by alkali metal dichromate; said salt being formed by adding from 1 to 50% by weight of the solids of said spent sulfite liquor of a salt selected from the group of iron sulfate, aluminum sulfate, chromium sulfate and copper sulfate and combinations thereof.

20. The process of claim 19 wherein the cation is iron.

21. The product of the process of claim 6.

22. The product of the process of claim 7.

23. The product of the process of claim 9.

24. The product of the process of claim 12.

25. The product of the process of claim 16.

26. The product of the process of claim 18.

27. The product of the process of claim 17, wherein the cation is aluminum.

References Cited in the file of this patent

UNITED STATES PATENTS

| | | |
|---|---|---|
| 2,418,981 | Muller | Apr. 15, 1947 |
| 2,445,838 | Melander et al. | July 27, 1948 |
| 2,491,436 | Barnes | Dec. 13, 1949 |
| 2,491,437 | Perkins | Dec. 13, 1949 |